United States Patent [19]

Pollalis et al.

[11] Patent Number: 5,016,170

[45] Date of Patent: May 14, 1991

[54] TASK MANAGEMENT

[76] Inventors: Spiro N. Pollalis, 44 Concord Ave., Apt. 106, Cambridge, Mass. 02138; Yasuo Ueda, 6-4-27 Hayashiji Ikunoku, Osaka 544, Japan

[21] Appl. No.: 247,778

[22] Filed: Sep. 22, 1988

[51] Int. Cl.$^5$ .............................................. G06F 15/21
[52] U.S. Cl. ...................................... 364/401; 364/402
[58] Field of Search ........ 364/401, 402, 200 MS File, 364/900 MS File

[56] References Cited

U.S. PATENT DOCUMENTS

| | | | |
|---|---|---|---|
| 3,703,630 | 11/1972 | Gelder | 364/401 |
| 3,725,650 | 4/1973 | Gelder | 364/402 |
| 4,852,001 | 7/1989 | Tsushima et al. | 364/401 |

FOREIGN PATENT DOCUMENTS 150140  6/1988  Japan ................................... 364/401

OTHER PUBLICATIONS

Kikuno et al., "Scheduling of Meetings in Office Information Systems", IEEE, 1982, pp. 318-325.
"Superproject Plus Users Guide and Reference Manual", Computer Associates, San Jose, Calif., ©1986, pp. (3)-16-18, 28-29, 32-33, 37-39, 44-48, (4)-29-31, (7)-2-12, (10)-1-3, 18-21, 23-26, 31-32, (11)-1-2, (12)-- 1-2, (15)-1-7.
InstaPlan User's Guide, InstaPlan Corporation, Mill Valley, Calif., Jul., 1987.

*Primary Examiner*—Jerry Smith
*Assistant Examiner*—Steven G. Kibby
*Attorney, Agent, or Firm*—Fish & Richardson

[57] ABSTRACT

The management of a set of tasks is aided graphically by a technique in which a quantity associated with each task is represented by a geometric object of at least two dimensions whose geometric area or volume is indicative of the quantity, each geometric object is displayed on a display device, and information about dependencies in the performance of the tasks are indicated graphically on the display.

36 Claims, 31 Drawing Sheets

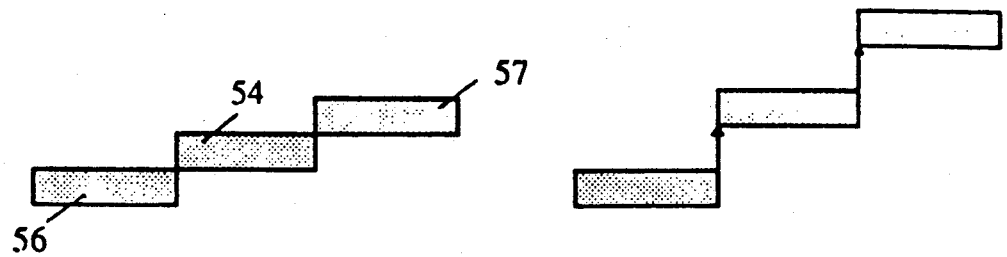
DEPENDENT QUANTIFIED BARS: CONTINUOUS
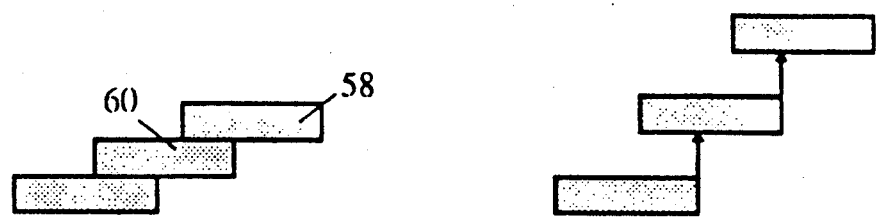
DEPENDENT QUANTIFIED BARS: OVERLAPPING
DEPENDENT QUANTIFIED BARS: PARALLEL
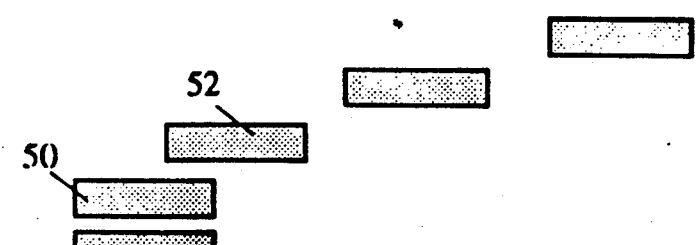
INDEPENDENT QUANTIFIED BARS
FIG. 3

| | AE | AF | AG | AH | AI | AJ | AK | AL | AM |
|---|---|---|---|---|---|---|---|---|---|
| 1 | LABOR ONLY | | | | | | | | |
| 2 | | | | CONTRACTED | | QTY*U.COST | | | (QTY/MP BY WAGE) |
| 3 | ACTIVITY | QUANTITY | | UNIT COST | | CONTRACTED | WAGE RATE | CALCULATED | CALCULATED |
| 4 | | OF WORK | | | | COST | DAYWORK | MANPOWER | PRODUCTIVITY |
| 5 | | | | | | | PAY | BY WAGE RATE | BY WAGE RATE |
| 6 | | | | | | | | MANDAYS | |
| 7 | CONCRETE | 8,000 | FT3 | $0.50 | /FT3 | $4,000 | $180 | 22 | 360 |
| 8 | | | | | | | | | |
| 9 | FORMWORK | 10,000 | FT2 | $2.00 | /FT2 | $20,000 | $220 | 91 | 110 |
| 10 | | | | | | | | | |
| 11 | RE-BAR WORK | 60,000 | LB | $0.17 | /LB | $10,000 | $200 | 50 | 1,200 |
| 12 | | | | | | | | | |
| 13 | M&E WORKS | — | | — | | $1,600 | $200 | 8 | — |
| 14 | | | | | | | | | |
| 15 | TOTAL | — | | — | | $35,600 | — | 171 | — |

| | AN | AO | AP | AQ | AR |
|---|---|---|---|---|---|
| 1 | | | | | |
| 2 | | | | ACTUAL | NO. IN CREW |
| 3 | EXPERIENCED | ADOPTED | ADOPTED | WORKING DAYS | FOR 10 DAYS |
| 4 | PRODUCTIVITY | PRODUCTIVITY | MANPOWER | FOR 10 DAYS | SCHEDULE |
| 5 | BY DATA | | | SCHEDULE | |
| 6 | | | MANDAYS | DAY | MEN |
| 7 | 500 FT3 | 400 FT3 | 20 | 1 + OVER TIME | 14 |
| 8 | | | | | |
| 9 | 90 FT2 | 100 FT2 | 100 | 6 | 17 |
| 10 | | | | | |
| 11 | 1,200 LB | 1,250 LB | 48 | 4 | 12 |
| 12 | | | | | |
| 13 | — | — | 8 | 1 | 8 |
| 14 | | | | | |
| 15 | — | — | 176 | 10 | AVERAGE 18 |
FIG. 6 (continue)
160

| | A | B | C | D | E | F | G | H | I | J | K | L | M |
|---|---|---|---|---|---|---|---|---|---|---|---|---|---|
| 1 | | | | | | | | | | | | | |
| 2 | | | | | CONCRETE WORK | | | | | FORMWORK | | | |
| 3 | | | | | | | | | | | | | |
| 4 | FLOOR | AREA | RATIO | CONCRETE | C/A | PRODUCT. | MANPR | RATIO | FORM | F/C | PROD. | MANPR | RATIO |
| 5 | | FT2 | A/TYP | FT3 | FT | FT3/MD | MEN | MP/TYP | FT2 | | FT2/MD | | MP/TYP |
| 6 | ROOF | 2,000 | 0.4 | 2,000 | 1 | 330 | 6 | 0.30 | 3,000 | 1.50 | 90 | 33 | 0.33 |
| 7 | 12F | 5,000 | 1 | 8,000 | 1.6 | 400 | 20 | 1.00 | 10,000 | 1.25 | 100 | 100 | 1.00 |
| 8 | 11F | 5,000 | 1 | 8,000 | 1.6 | 400 | 20 | 1.00 | 10,000 | 1.25 | 100 | 100 | 1.00 |
| 9 | 10F | 5,000 | 1 | 8,000 | 1.6 | 400 | 20 | 1.00 | 10,000 | 1.25 | 100 | 100 | 1.00 |
| 10 | 9F | 5,000 | 1 | 8,000 | 1.6 | 400 | 20 | 1.00 | 10,000 | 1.25 | 100 | 100 | 1.00 |
| 11 | 8F | 5,000 | 1 | 8,000 | 1.6 | 400 | 20 | 1.00 | 10,000 | 1.25 | 100 | 100 | 1.00 |
| 12 | 7F | 5,000 | 1 | 8,000 | 1.6 | 400 | 20 | 1.00 | 10,000 | 1.25 | 100 | 100 | 1.00 |
| 13 | 6F | 5,000 | 1 | 8,000 | 1.6 | 400 | 20 | 1.00 | 10,000 | 1.25 | 100 | 100 | 1.00 |
| 14 | 5F | 5,000 | 1 | 8,000 | 1.6 | 400 | 20 | 1.00 | 10,000 | 1.25 | 100 | 100 | 1.00 |
| 15 | 4F | 5,000 | 1 | 8,000 | 1.6 | 400 | 20 | 1.00 | 10,000 | 1.25 | 100 | 100 | 1.00 |
| 16 | 3F | 5,000 | 1 | 8,000 | 1.6 | 400 | 20 | 1.00 | 10,000 | 1.25 | 100 | 100 | 1.00 |
| 17 | 2F | 10,000 | 2 | 18,000 | 1.8 | 467 | 39 | 1.93 | 18,000 | 1.00 | 80 | 225 | 2.25 |
| 18 | 1F | 10,000 | 2 | 18,000 | 1.8 | 467 | 39 | 1.93 | 18,000 | 1.00 | 80 | 225 | 2.25 |
| 19 | B1F | 10,000 | 2 | 20,000 | 2 | 467 | 43 | 2.14 | 15,000 | 0.75 | 100 | 150 | 1.50 |
| 20 | B2F | 10,000 | 2 | 20,000 | 2 | 467 | 43 | 2.14 | 16,000 | 0.80 | 100 | 160 | 1.60 |
| 21 | FOUND. | 10,000 | 2 | 26,000 | 2.6 | 667 | 39 | 1.95 | 12,000 | 0.46 | 90 | 133 | 1.33 |
| 22 | TOTAL | 102,000 | 20.4 | 184,000 | 1.80 | 451 | 408 | 20.39 | 182,000 | 0.99 | 94.5 | 1,927 | 19.27 |
| 23 | | | | | | | | | | | | | |
| 24 | | | | | ASSUME | ASSUME | ASSUME | | | | ASSUME | ASSUME | |
| 25 | | | | | MONITOR | MONITOR | MONITOR | | | | MONITOR | MONITOR | |

FIG. 9

| | N | O | P | Q | R | S | T | U | V | W | X | Y | Z | AA | AB |
|---|---|---|---|---|---|---|---|---|---|---|---|---|---|---|---|
| 1 | | | | | | | | | | | | | | | |
| 2 | | | | | | | | | | | | | | | DAYS |
| 3 | RE-BAR WORK | | | | | M&E WORK | | | TOTAL | BY RATIO | DURATION | | ADOPTED | DECIDED | ROUNDED |
| 4 | RE-BAR | R/C | PROD. | MANPR | RATIO | MANPR | MANDAYS | MANPR | RATIO | AREA | FORM | TOTAL | RATIO | DAYS PER | FOR |
| 5 | LB | LB/FT3 | LB/MD | | | MANDAYS | | MANDAYS | | | | | TOTAL | FLOOR | SCHEDULE |
| 6 | 10,000 | 5.0 | 1,000 | 10 | 0.21 | 3 | 0.4 | 53 | 0.30 | 4 | 3 | 3 | 0.30 | 2.83 | 3 |
| 7 | 60,000 | 7.5 | 1,250 | 48 | 1.00 | 8 | 1 | 176 | 1.00 | 10 | 10 | 10 | 1.00 | 9.47 | 10 |
| 8 | 60,000 | 7.5 | 1,250 | 48 | 1.00 | 8 | 1 | 176 | 1.00 | 10 | 10 | 10 | 1.00 | 9.47 | 10 |
| 9 | 60,000 | 7.5 | 1,250 | 48 | 1.00 | 8 | 1 | 176 | 1.00 | 10 | 10 | 10 | 1.00 | 9.47 | 10 |
| 10 | 60,000 | 7.5 | 1,250 | 48 | 1.00 | 8 | 1 | 176 | 1.00 | 10 | 10 | 10 | 1.00 | 9.47 | 10 |
| 11 | 60,000 | 7.5 | 1,250 | 48 | 1.00 | 8 | 1 | 176 | 1.00 | 10 | 10 | 10 | 1.00 | 9.47 | 10 |
| 12 | 60,000 | 7.5 | 1,250 | 48 | 1.00 | 8 | 1 | 176 | 1.00 | 10 | 10 | 10 | 1.00 | 9.47 | 10 |
| 13 | 60,000 | 7.5 | 1,250 | 48 | 1.00 | 8 | 1 | 176 | 1.00 | 10 | 10 | 10 | 1.00 | 9.47 | 10 |
| 14 | 60,000 | 7.5 | 1,250 | 48 | 1.00 | 8 | 1 | 176 | 1.00 | 10 | 10 | 10 | 1.00 | 9.47 | 10 |
| 15 | 60,000 | 7.5 | 1,250 | 48 | 1.00 | 8 | 1 | 176 | 1.00 | 10 | 10 | 10 | 1.00 | 9.47 | 10 |
| 16 | 60,000 | 7.5 | 1,250 | 48 | 1.00 | 8 | 1 | 176 | 1.00 | 10 | 10 | 10 | 1.00 | 9.47 | 10 |
| 17 | 144,000 | 8.0 | 1,000 | 144 | 3.00 | 16 | 2 | 424 | 2.41 | 20 | 23 | 24 | 2.41 | 22.80 | 23 |
| 18 | 144,000 | 8.0 | 1,000 | 144 | 3.00 | 16 | 2 | 424 | 2.41 | 20 | 23 | 24 | 2.41 | 22.80 | 23 |
| 19 | 160,000 | 8.0 | 1,100 | 145 | 3.03 | 16 | 2 | 354 | 2.01 | 20 | 15 | 20 | 2.01 | 19.07 | 19 |
| 20 | 160,000 | 8.0 | 1,100 | 145 | 3.03 | 16 | 2 | 364 | 2.07 | 20 | 16 | 21 | 2.07 | 19.61 | 20 |
| 21 | 208,000 | 8.0 | 1,400 | 149 | 3.10 | 16 | 2 | 337 | 1.91 | 20 | 13 | 19 | 1.91 | 18.14 | 18 |
| 22 | 1,426,000 | 7.8 | 1,171 | 1,217 | 25.36 | 163 | 20 | 3,715 | 21.11 | 204 | 193 | 211 | 21.11 | 200.00 | 206 |
| 23 | | | | | | | | | | | | | | | |
| 24 | | | ASSUME | ASSUME | | | | ASSUME | | SELECT | SELECT | SELECT | DECIDE | ADJUST | ANSWER |
| 25 | | | MONITO | MONITOR | | | | MONITOR | | | | | | | |

FIG. 9 (continue)

| ACTIVITY \ LOCATION | 1F | 2F | 3F | 4F | 5F | 6F | 7F | 8F | 9F | 10F | 11F | 12F | RF |
|---|---|---|---|---|---|---|---|---|---|---|---|---|---|
| STRUCTURE WORK | ▨ | ▨ | ▨ | ▨ | ▨ | ▨ | ▨ | ▨ | ▨ | ▨ | | | |
| DISMANTLE & CLEANING | ▨ | ▨ | ▨ | ▨ | ▨ | ▨ | ▨ | ▨ | | | | | |
| M & E WORK (FLOOR TO FLOOR) | ▨ | ▨ | ▨ | ▨ | ▨ | ▨ | ▨ | | | | | | |
| FLOOR SCREEDING | ▨ | ▨ | ▨ | ▨ | ▨ | ▨ | | | | | | | |
| DRY WALL PARTITIONS (STUDS) | ▨ | ▨ | ▨ | ▨ | ▨ | | | | | | | | |
| M&E WORK (PIPING) | ▨ | ▨ | ▨ | ▨ | ▨ | | | | | | | | |
| DOOR & WINDOW FRAMES | ▨ | ▨ | ▨ | ▨ | | | | | | | | | |
| DRY WALL PARTITIONS (BOARDS) | ▨ | ▨ | ▨ | | | | | | | | | | |
| M&E WIRING | ▨ | ▨ | | | | | | | | | | | |
| CEILING GRID | ▨ | | | | | | | | | | | | |
| PAINTING (1ST & 2ND COAT) | | | | | | | | | | | | | |
| CEILING BOARDS | | | | | | | | | | | | | |
| DOOR PANELS | | | | | | | | | | | | | |
| FLOOR FINISHING | | | | | | | | | | | | | |
| IRONMONGERY | | | | | | | | | | | | | |
| PAINTING (FINAL COAT) | | | | | | | | | | | | | |
| FITTINGS | | | | | | | | | | | | | |

TASK MANAGEMENT

BACKGROUND OF THE INVENTION

This invention relates to task management.

Projects and group activities often involve tasks whose sequence must be planned and monitored in light of the resources required and available.

In the construction of concrete buildings, for example, such tasks as concrete work, form work, carpentry, and finish work, must be coordinated, and the available resources, such as working crews and equipment, must be distributed among them systematically. The construction planner, based on experience, must plan the sequence in which the work will be done, and the rate at which resources will be devoted to any task (e.g. how many men to include in the work crew that will pour the concrete foundation).

During construction, the effects on the plan of changed circumstances, such as design alterations, labor strikes, or unforeseen underground obstructions, must be considered by the construction superviser.

One method of construction scheduling is the critical path method, CPM, in which diagrams depict the stages of a project as nodes, and the durations of the tasks required to reach the successive stages as arrows. In a variation of CPM, known as PERT, ranges of task duration may also be shown. Additional information, such as cost or number of workers, may be added in the form of text along the arrows or on the nodes of the diagram.

Another technique, linear scheduling, depicts repetitive tasks by a line plotted on a coordinate system in which the horizontal axis represents time, the vertical axis represents location, and the slope of the line represents the projected production rate for the task.

SUMMARY OF THE INVENTION

In a general feature of the invention, the management of a set of tasks is aided graphically by a technique in which a quantity associated with each task is represented by a geometric object of at least two dimensions whose geometric area or volume is indicative of the quantity; each geometric object is displayed on a display device; and information about dependencies in the performance of the tasks are indicated graphically on the display.

Preferred embodiments of the invention include the following features.

Each object is a rectangular quantified bar. The extent of an object along one dimension is indicative of the period of time required for the task, and the extent of the object along one dimension corresponds to an amount of resources per unit time required for the task. The quantity associated with each task is the aggregate amount of resource (e.g., money, or manpower, or quantity of work) required for the task.

The information about dependencies of the performance of the tasks (including temporal dependencies or spatial independence) is indicated by the position of each object on the display (e.g., by shared boundaries between objects) or by lines connecting the objects. The display defines a time axis and the objects are arranged along the time axis to indicate the relative times when the tasks are to begin and end.

A set of objects representing related tasks at a first level of the project are associated together for display, and an object is generated at a higher level to represent a combination of the set of objects at the first level such that the configuration of the higher level object as displayed is indicative of the total resources required to perform the tasks represented by the objects at the first level. When changes are made to an object at the first level, the configuration of the higher level object is changed automatically.

Alphanumeric data corresponding to the objects are displayed in a table associated with the display of the objects. The alphanumeric data include information about the times when each task is to begin and end and the resources per unit time required for the task. The table and the objects are computationally linked so that changes made to either the objects or the table are automatically translated into changes in the other. The table and the objects are displayed simultaneously. The table is in the form of a spread sheet in which cells are related by computational rules.

The sets of tasks are repetitive tasks to be performed at different locations and are represented by objects arranged along parallel rows on the display. The objects are arranged on the display to indicate the sequence of repetitive tasks to be performed by a work crew. The tasks in each row are positioned to reflect the dependencies of the tasks.

A user interface permits the user to alter the size, shape, and location of each object on the display. In some embodiments, the tasks are tasks in a construction project.

The system is interactive, readily understandable, capable of generating meaningful visual images which are useful for the development of schedules and easily updated. It can be employed to develop an initial schedule, monitor progress, generate forecasting information, and manage a project or group activity. Large amounts of information can be effectively displayed in a small space. The hierarchical structure allows rapid switching between high level charts and those which depict the greatest level of detail. Labor is made easier. The system enables the project planner to make the best use of his experience and judgment.

DESCRIPTION OF THE PREFERRED EMBODIMENT

We first briefly describe the drawings.

FIG. 3 is a diagram of possible relationships among quantified bars.

FIG. 6 is a diagram of a spread sheet corresponding to FIG. 4.

FIG. 9 is a spread sheet for all floors of a building.

Figure 5:
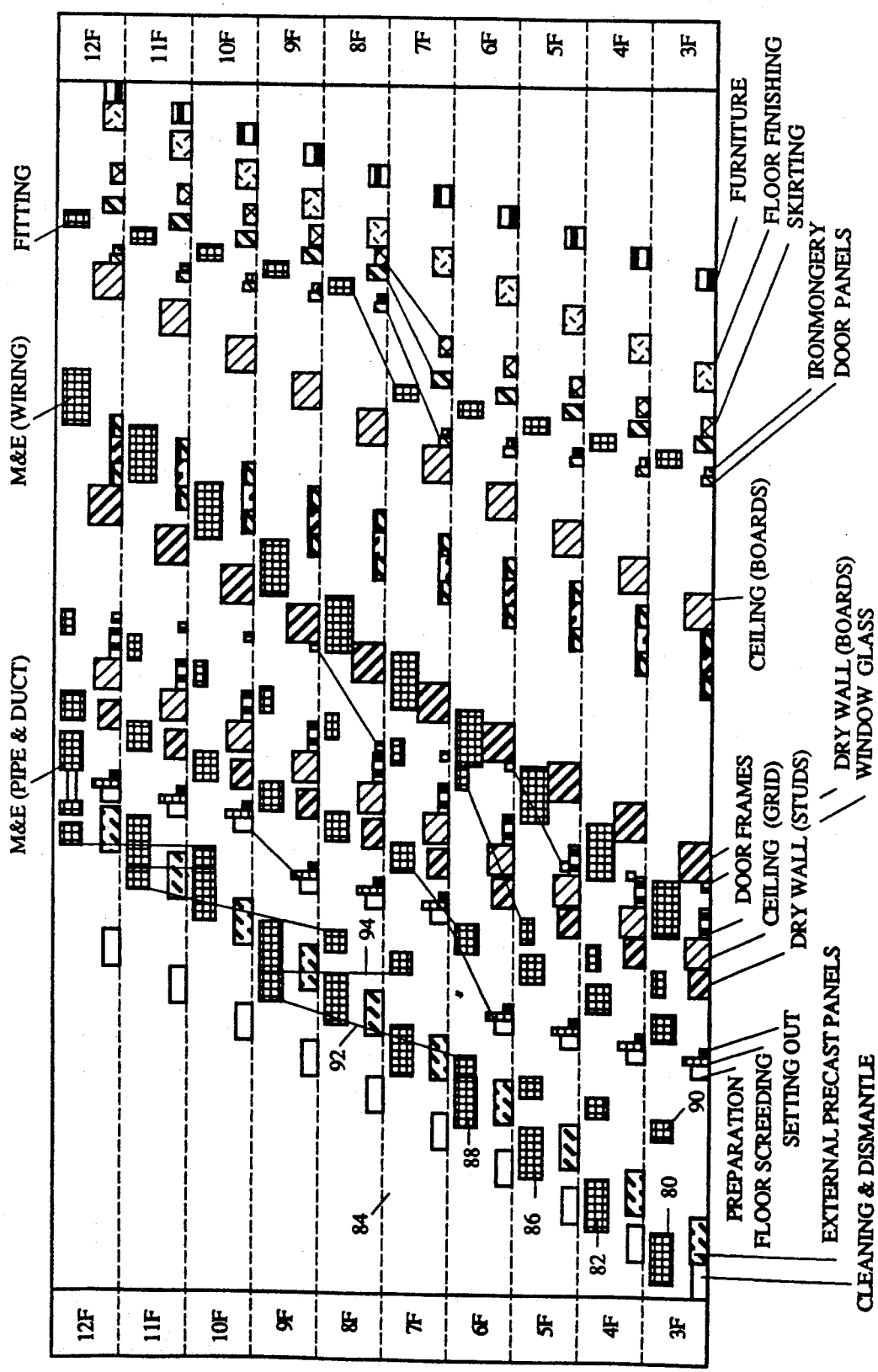
FIG. 5 is a diagram of a matrix balanced chart for finish work on the various different floors of a building.
Figure 20:
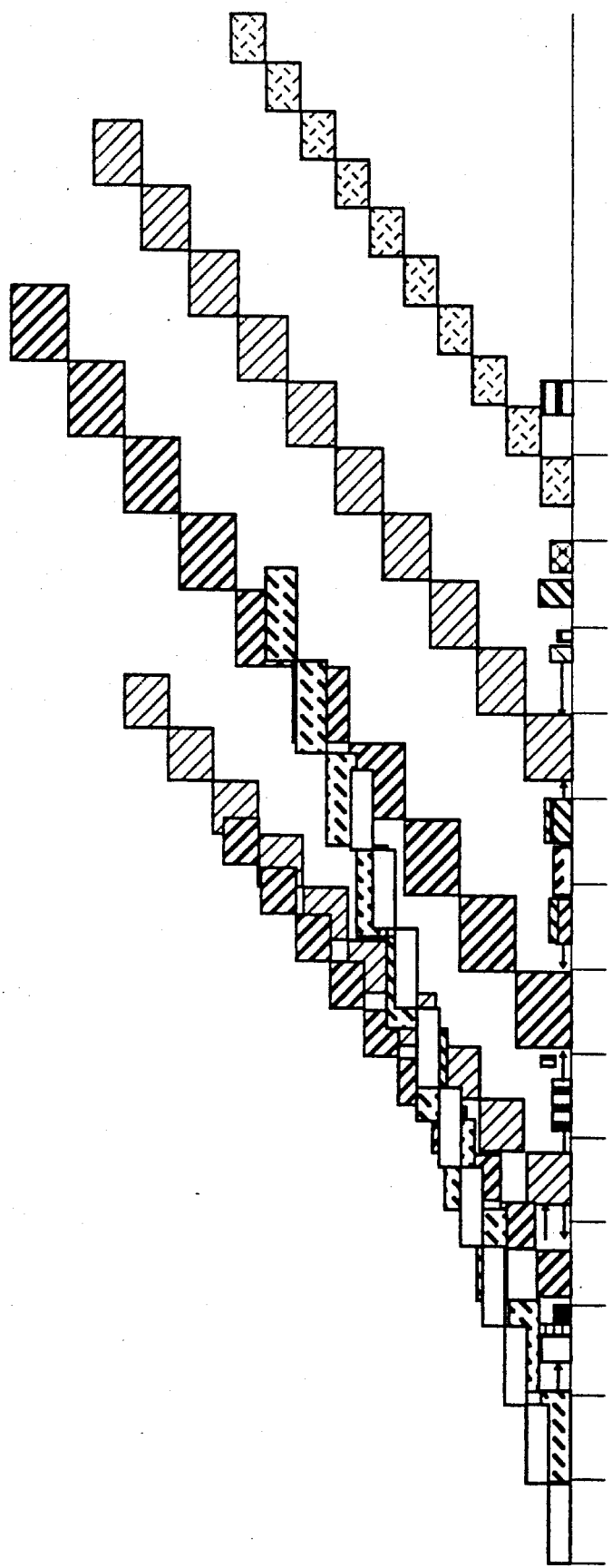
Figure 21:
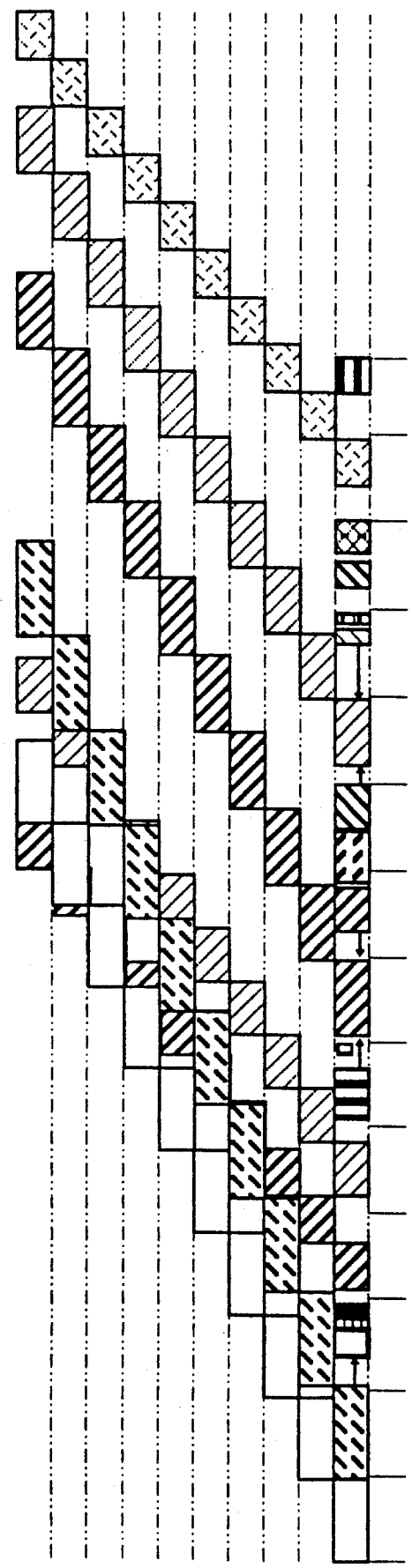
Figure 22:
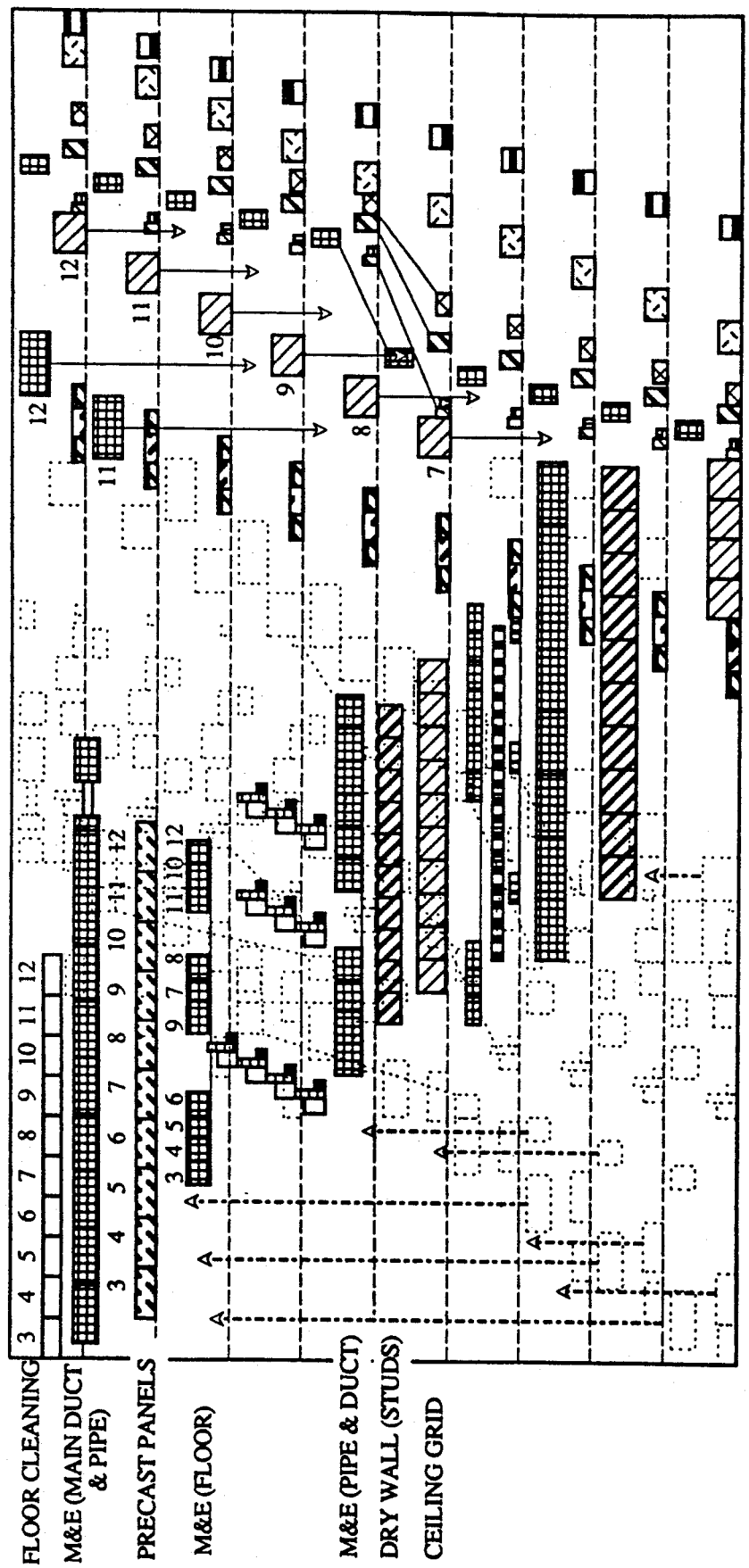

FIGS. 20, 21, and 22 are diagrams of alternative techniques for illustrating the relationships of the tasks shown in FIG. 5.

Figure 4:
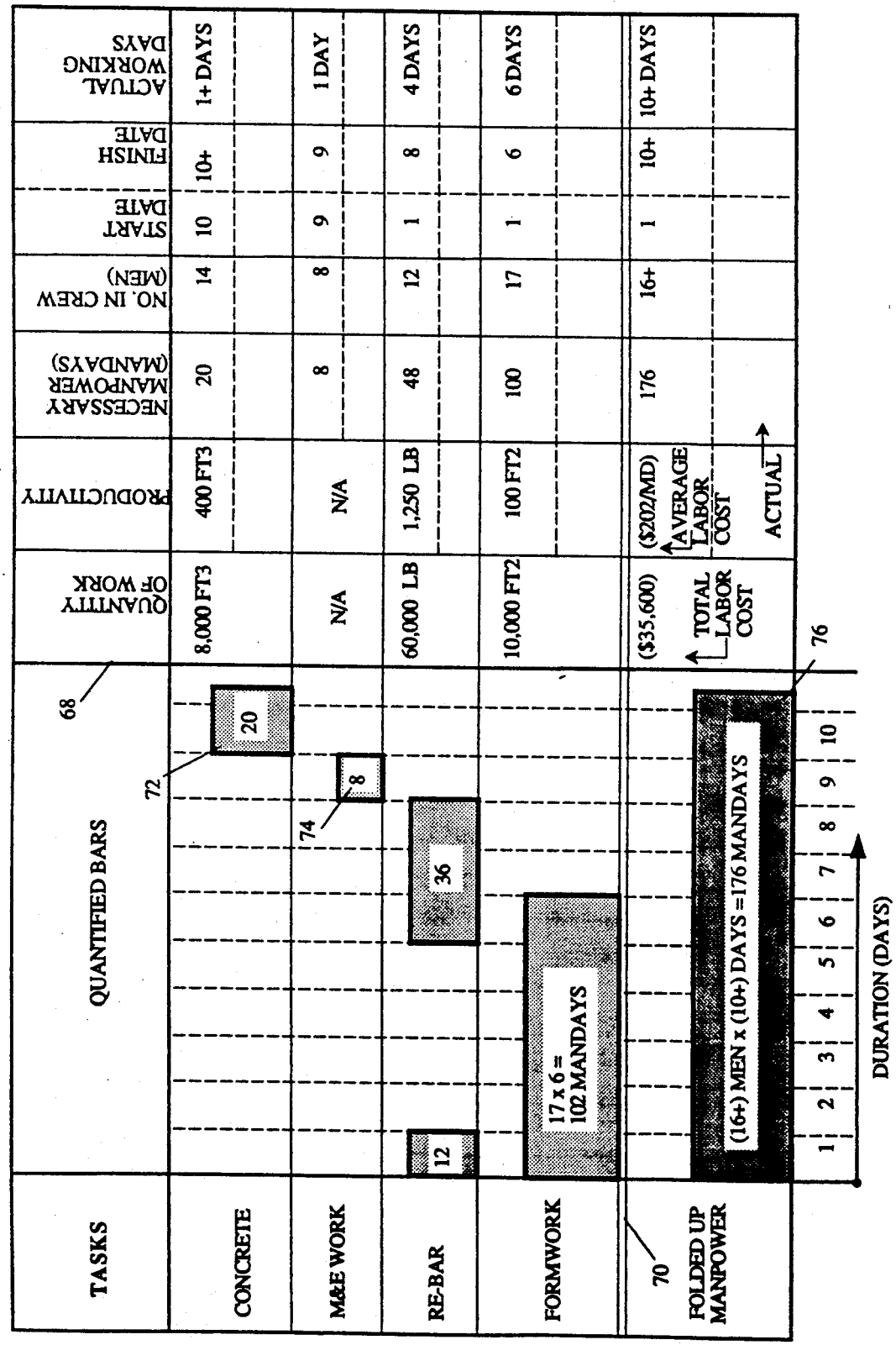
FIG. 4 is a diagram of a template including a quantified bar chart.
Figure 23:
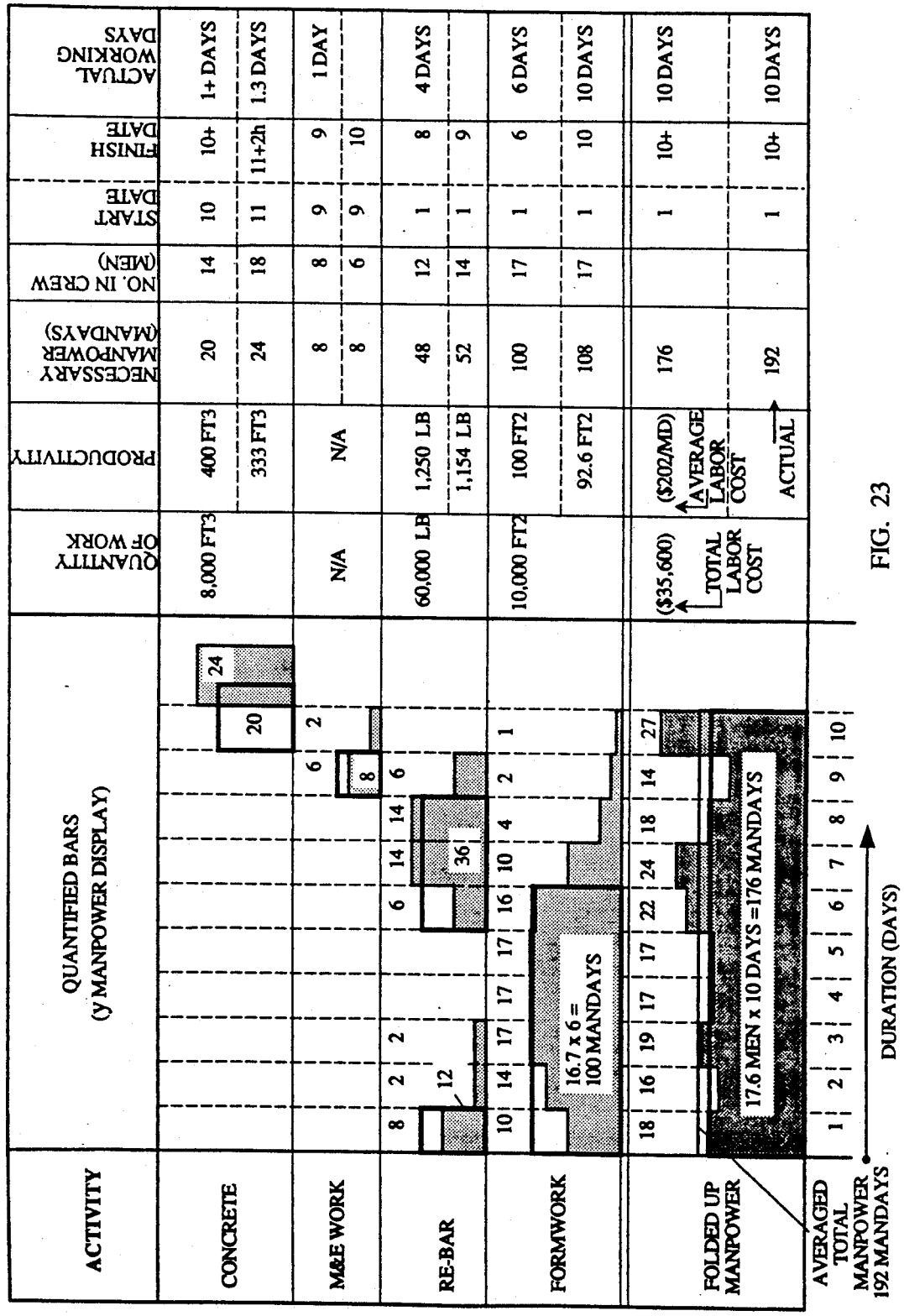

FIGS. 23, 24 are diagrams illustrating the monitoring of the projects which are depicted in FIGS. 4 and 5, respectively.

Figure 25:
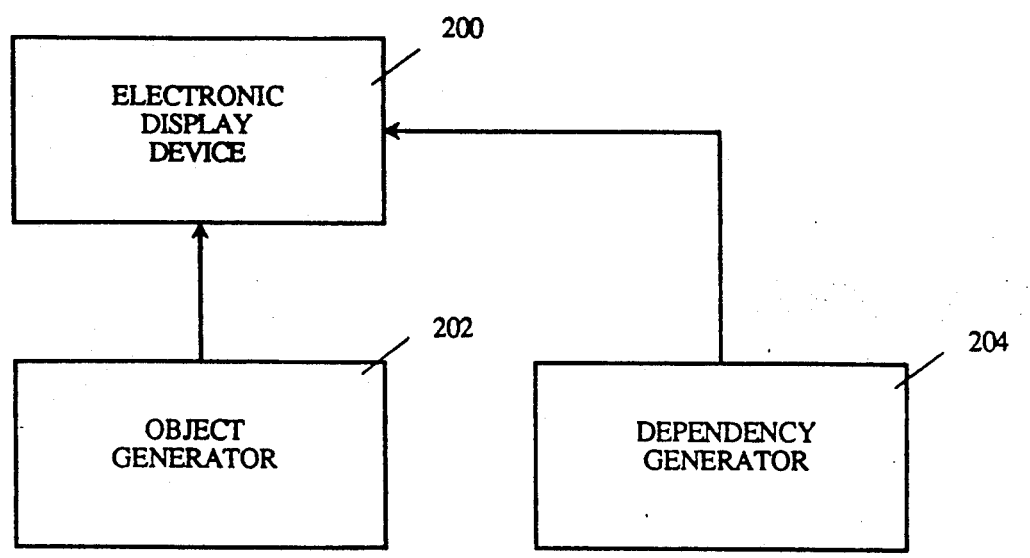

FIG. 25 is a block diagram of a system for graphically aiding the management of a set of tasks.

Figure 26:
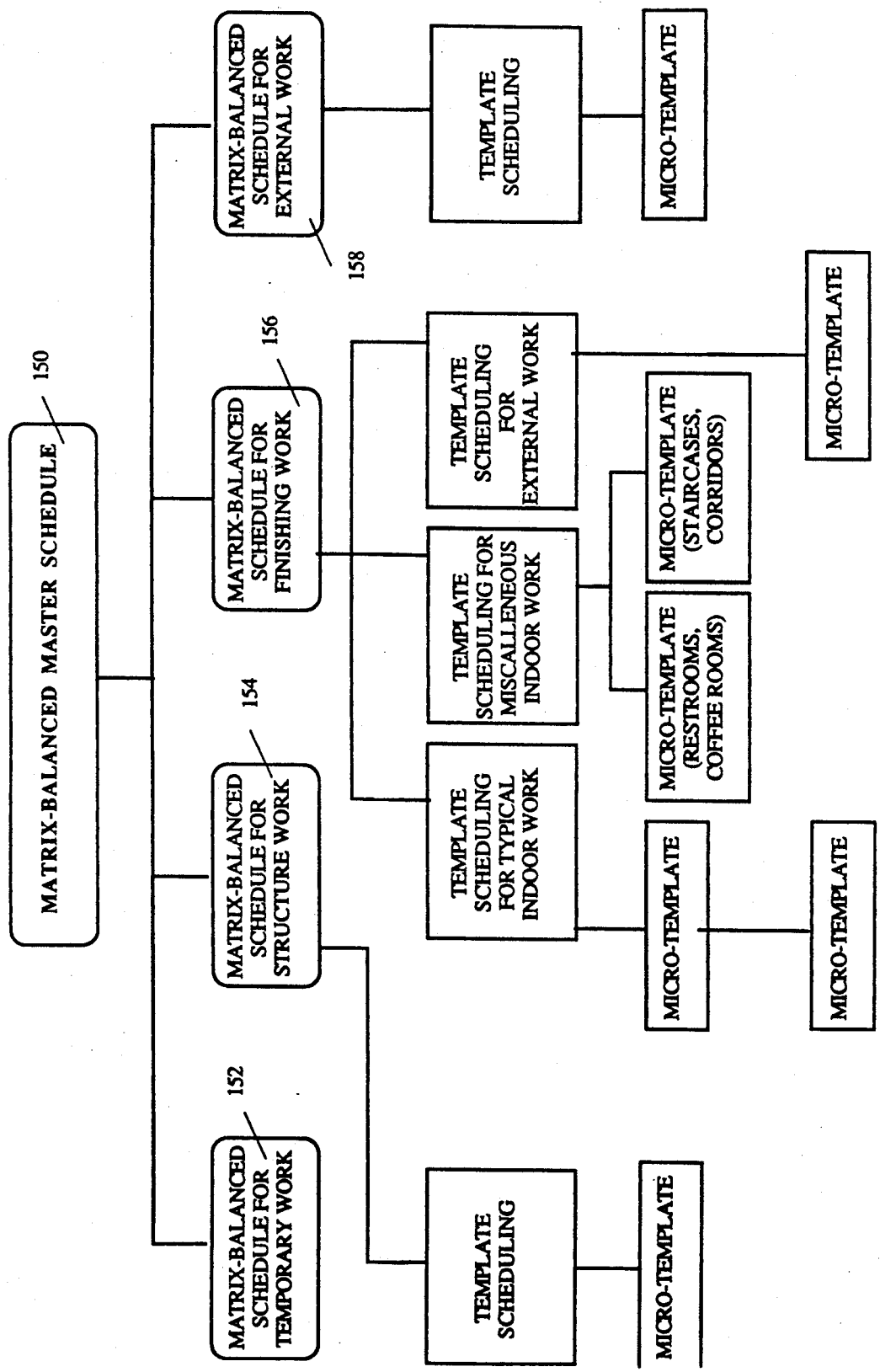

FIG. 26 is a chart of templates and matrix balanced schedules for a construction project.

Figure 27:
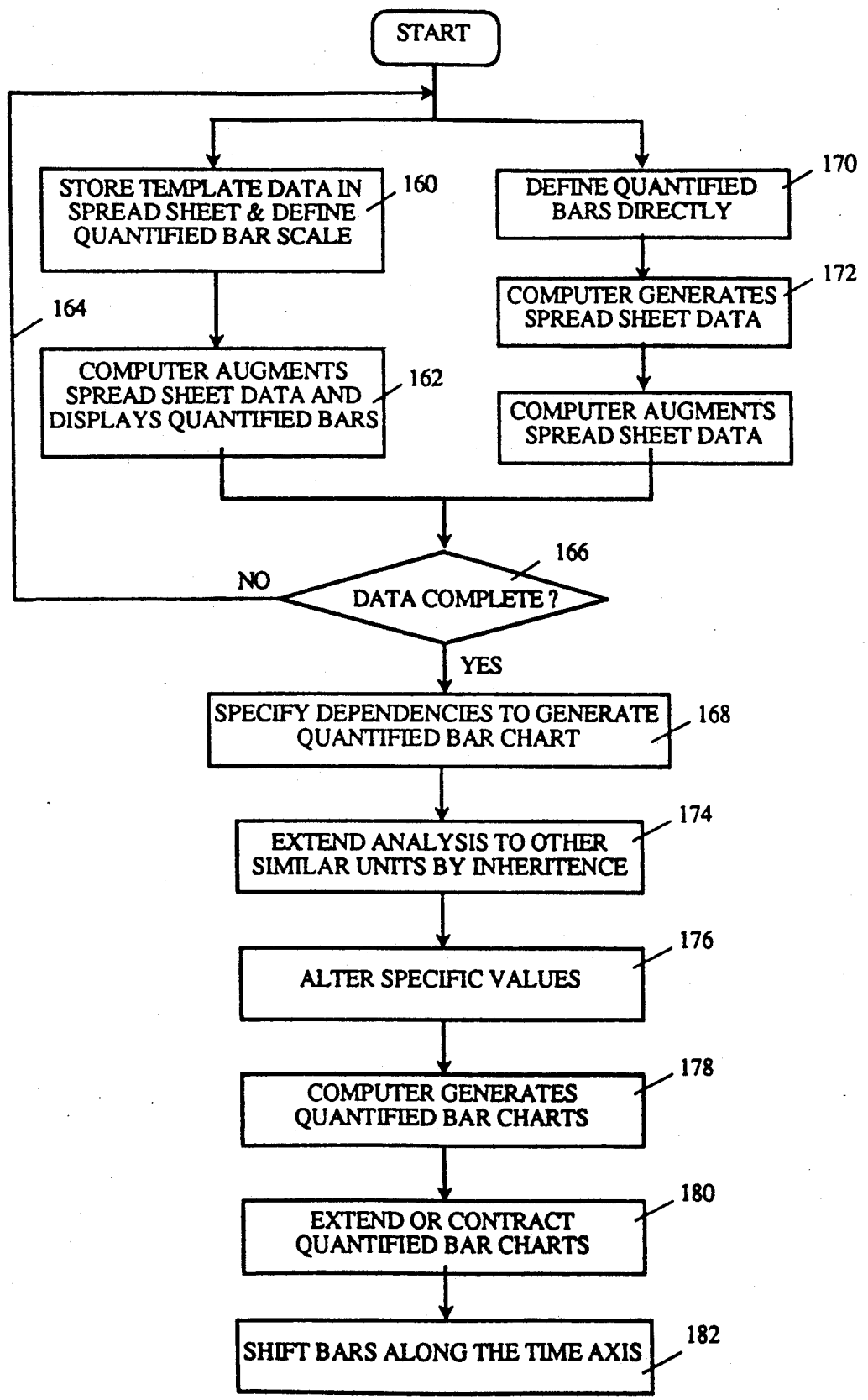
Figure 28:
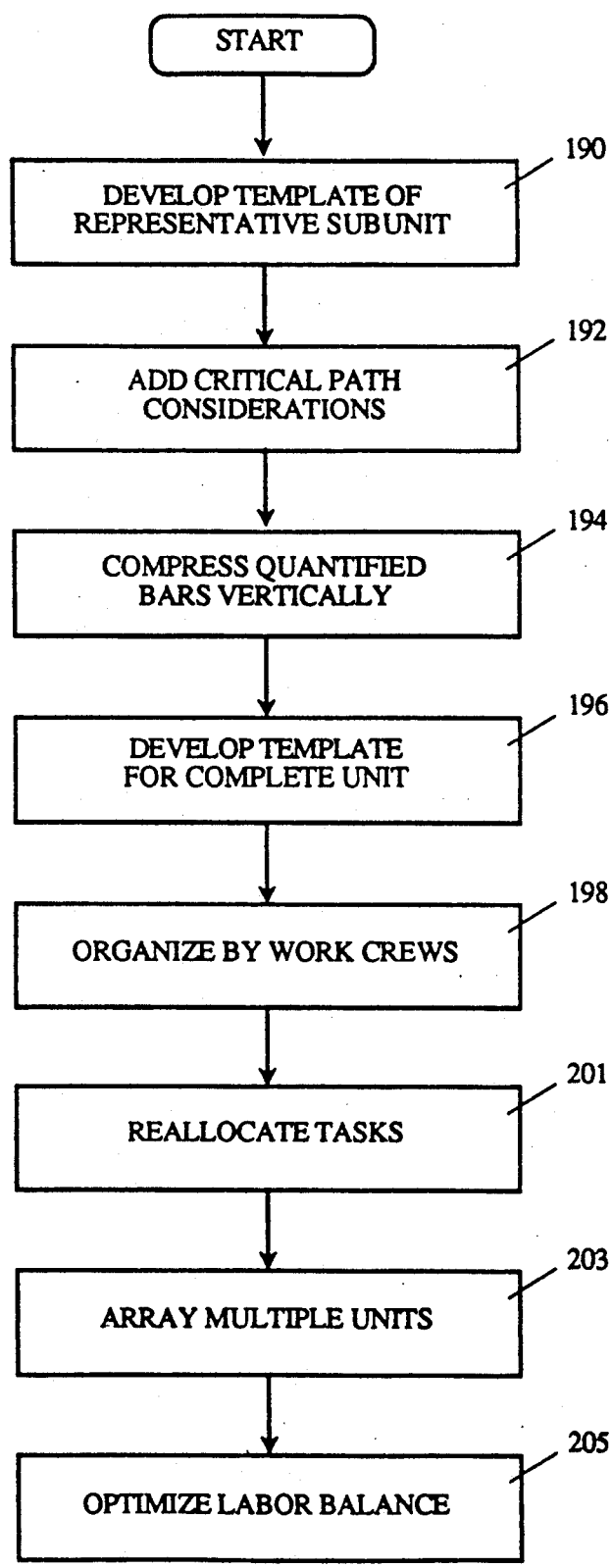

FIGS. 27 and 28 are flow charts illustrating, respectively, the generation of quantified bar charts and matrix balanced quantified bar charts.

Figure 29:
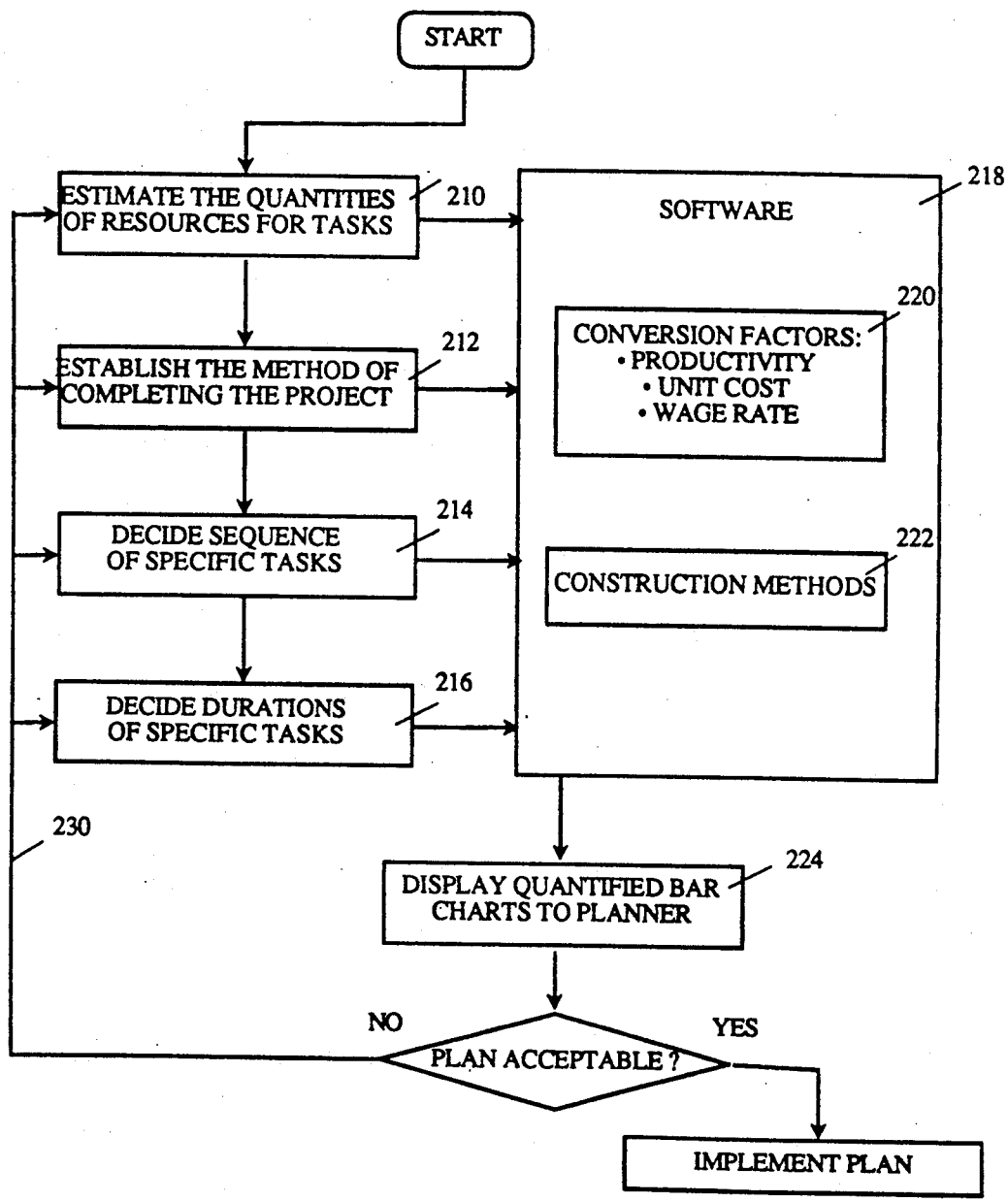

FIG. 29 is a flow chart illustrating the planning of a project.

STRUCTURE AND OPERATION

In the invention, a project planner or a project superviser can interactively develop and display on a computer terminal graphical representations of the tasks that make up the project and the temporal and spatial relationships of the tasks. By manipulating the graphical representations or related data, the planner or superviser can, among other things, adjust the plan, consider hypothetical situations, and monitor the performance of the project at successive stages.

Figure 1:
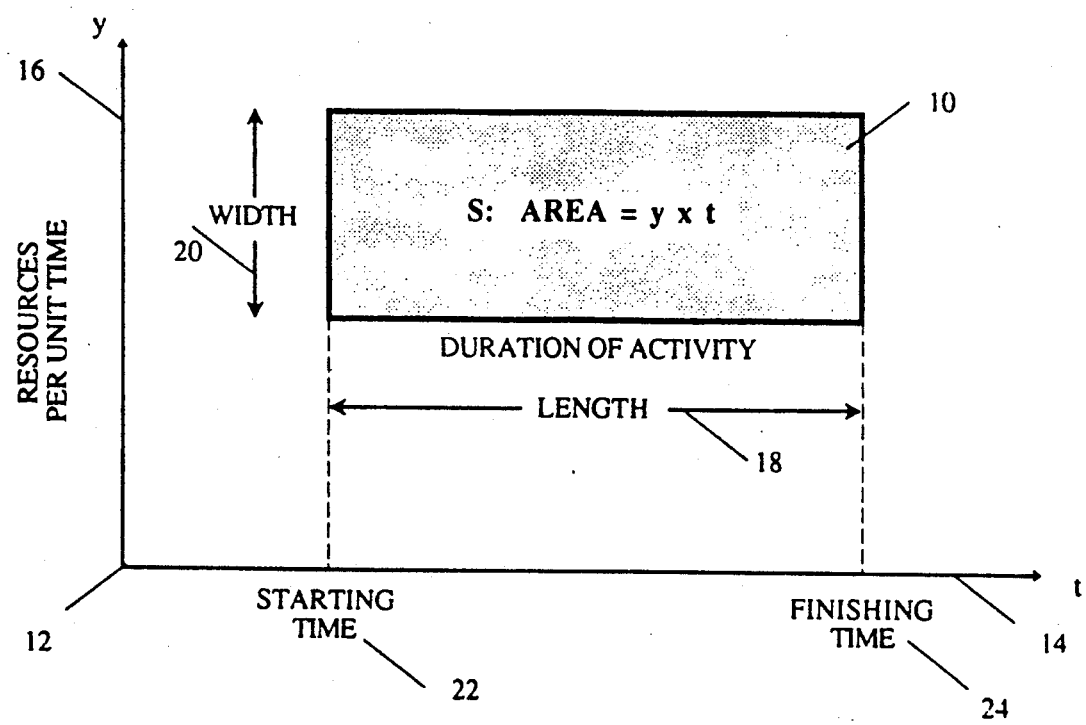
FIG. 1 is a diagram of a quantified bar.

Referring to FIG. 1, in building a graphical representation of a project, each one of a set of tasks to be managed is depicted by a quantified bar 10 in the form of a rectangular geometric object positioned within a two dimensional coordinate plane 12. The horizontal axis 14 represents time, and the vertical axis 16 represents resources per unit time, for example, manpower per unit time, cost per unit time, or quantity of work per unit time. The length 18 of the quantified bar 10 corresponds to the duration of the task and the height (also called the width) 20 of the bar to the resources dedicated to the task per unit time. The position of the bar 10 along the horizontal axis 14 depicts the timing of the task. The positions of the left and right sides of the bar along the horizontal axis correspond to the starting and finishing times 22, 24 of the task.

Thus, the area of the quantified bar represents the total quantity of resources (man-days, cost, or quantity of work) required for the task.

Figure 2:
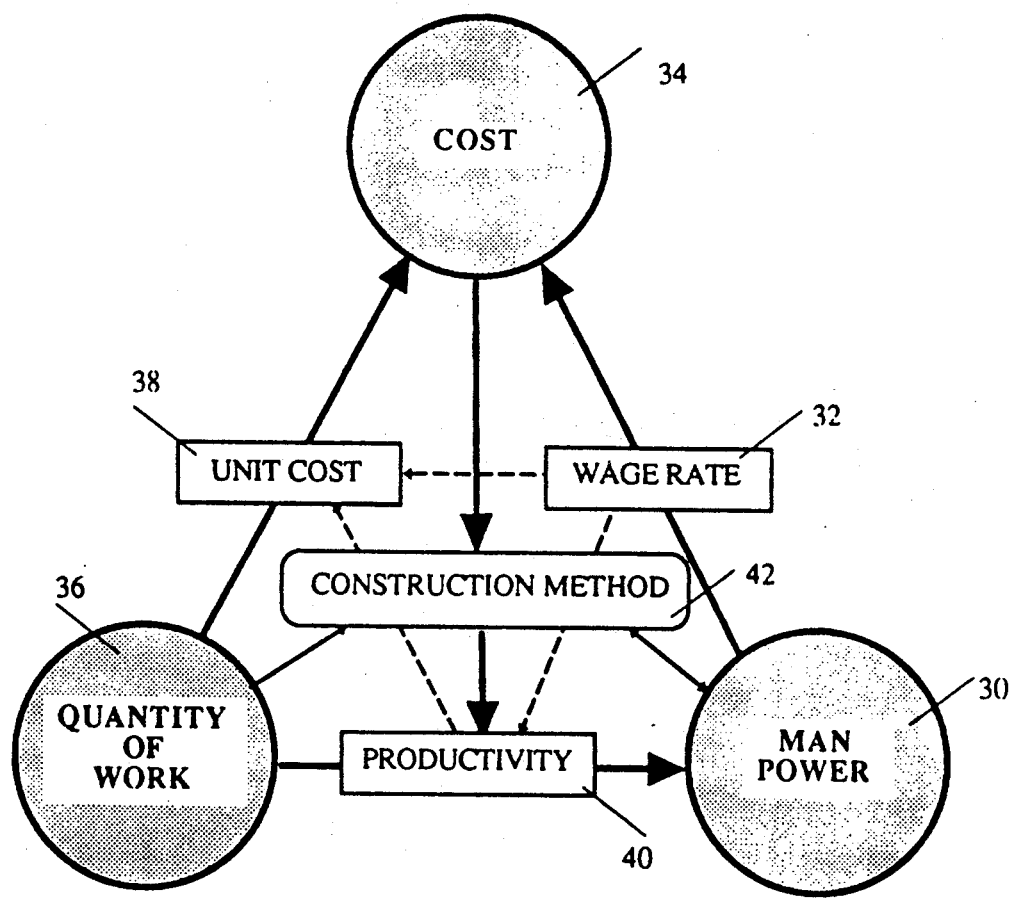
FIG. 2 is a diagram of the relationships among resources for a construction project.

Referring to FIG. 2, the total manpower 30 (e.g. man-days) multiplied by the wage rate 32 (e.g. dollars per man-day) gives the total cost 34; total cost 34 (e.g. dollars) is also quantity of work 36 (e.g., cubic yards of concrete) multiplied by unit cost 38 (e.g., dollars per cubic yard). Quantity of work 36 divided by productivity 40 (e.g. cubic yards of concrete poured per man-day) gives manpower 30. Manpower, cost, and quantity of work all influence, and are affected by, the construction method 42. Wage rate affects both productivity and unit cost; and productivity also affects unit cost.

In construction work, for example, these conversion factors will depend on such things as the construction technology, the expertise of the construction workers, and the characteristics of the project. Thus in a quantified bar of a given length (duration) and width, the width can equally well be made to represent manpower or quantity of work or cost, in each case per unit time, simply by noting that duration = quantity of work/number of men·productivity duration = total cost/cost per day duration = manpower/number of men The system can easily change the resources represented by the quantified bar provided it knows the appropriate conversion factors represented by unit cost, wage rate, and productivity, and these may be entered by the user.

For purposes of scheduling, discrete tasks are depicted on the terminal display device as separate quantified bars. A discrete task is either independent or dependent with respect to any other discrete task. Referring to FIG. 3, dependent relationships are depicted by joining the quantified bars either by arrows or by common points or boundaries. Two tasks 50, 52 which are independent may each start and end without reference to the other task. For dependent tasks, three possible interrelationships may be set up. If one of the tasks 54 cannot start until the other task 56 is finished, the tasks are considered continuous. If one task 58 can start after the other task 60 is started but before that other task is completed, the tasks are considered overlapping. Finally, two tasks 62, 64 which may need to be carried out at the same time are considered parallel.

A critical path for the scheduling of discrete tasks thus may be depicted by the relative positions of and links between the quantified bars that represent the tasks. Where the critical path permits some float between two successive tasks, the float will allow the quantified bars representing the two tasks to be separated by a variable amount of time.

The system provides for the creation of interrelated quantified bar charts at varying levels of detail in a hierarchical structure. For example, at a macro level, a single quantified bar may represent all concrete work for a project. At a lower level there may be corresponding quantified bars for each of the different concrete tasks, e.g., foundation, columns, and floors. At any particular level of detail, a quantified bar thus may represent a discrete task or a group of discrete tasks.

Although we have thus far described the representation of tasks only in terms of the quantified bars, the numerical and alphabetic information that corresponds to the bars and their relationships is also stored in the computer in a spreadsheet form, and links between the data and the quantified bars allow the computer to maintain continuing consistency between the two.

The quantified bars (together with the corresponding numerical and textual data at a given level) make up a template. Referring to FIG. 4, for example, a template for the structural skeleton of a typical floor of a building might consist of data and quantified bars for tasks related by job code.

In FIG. 4, dependencies among quantified bars are depicted by the relative starting and ending times of the bars. On the left side of FIG. 4 (generally to the left of line 68) are the quantified bars; on the right side are the related data in spreadsheet form. Four tasks are defined: concrete, mechanical and electrical (M&E), re-bar, and form. Concrete work begins on the tenth day, continues into the eleventh day (the length of bar 72 is greater than one day), and uses 14 men per day for an aggregate manpower of 20 man-days. The table of data indicates that the quantity of work would by 8000 ft$^3$, and the productivity would be 400 ft$^3$ per man-day, requiring 20 man-days. Thus note that bar 72 could alternatively represent the 8000 ft$^3$ total concrete by a width corresponding to 8000 ft$^3$ (14 men/20 man-days)=5600 ft$^3$/day.

The mechanical and electrical work, represented by quantified bar 74, must end on the ninth day (before the concrete work begins). Bar 74 has a duration of one day, uses 8 men, and has a width of 8 men per day. Note that, although only 100 man-days are required, it is assumed that the 8 man crew will be on the job 6 full days so that 108 man-days could actually be performed.

The information on the template represents a combination of experience of the planner (for example the knowledge that re-bar work must precede mechanical and electrical work) and the requirements of the tasks that make up the project (for example the fact that 8000 cubic feet of concrete are required).

The system is capable of aggregating a group of related tasks of a template at one level to form a composite quantified bar for use in a higher level template. This procedure is referred to as "folding-up." The higher level quantified bar representing the aggregated tasks has a length determined by the critical path for the group of tasks. The length corresponds to the duration of the aggregated tasks when performed in the sequence and with the time constraints required by the critical path. The area of the folded-up quantified bar corresponds to the total resources required by the aggregated tasks.

Each template, in addition to the numerical and textual data and the quantified bars associated with related tasks may also contain a display of the folded-up bar resulting from aggregating all of the tasks depicted in the template. In FIG. 4, for example, quantified bar 76 (below double line 70) is a folded-up version of all of the quantified bars above double line 70. Bar 76 is 10+ days long and has a width of 16+ men for an aggregate of 176 man-days. On the data side (opposite bar 76) are shown the average labor cost of $202 per man-day and the corresponding total labor cost of $35,600. Bar 76 and the associated data could appear as one entry in a higher level template.

The example above concerned a set of tasks that were related by a critical time path, an arrangement that is particularly useful for projects like the structural work for a high-rise building. The invention is also useful for scheduling repetitive activities, for example, the finish work on the different floors of the building, where floors can be worked on simultaneously or in any order.

Referring to FIG. 5, for example, information can be stored and displayed as quantified bars that represent tasks to be performed at each one of a number of successive locations.

In FIG. 5, quantified bars are arranged in groups as indicated by their respective shadings. The solid bars 80, for example, could each represent mechanical and electrical work on a given floor. Successive floors (3 through 13) are represented by successive layers arranged in the vertical direction, with each layer referring to a different floor in the building. The relative starting times and dependencies of discrete tasks are displayed simultaneously for all floors, facilitating refinements to the scheduling.

In layer 84, for instance, the relative locations of the quantified bars in the horizontal direction on a given floor indicate the relative scheduled starting times of the different tasks on that floor, with the relative starting times satisfying the critical path as to a given floor. The horizontal spacing between some tasks indicates the float permitted by the critical path.

At the same time, dependencies between like tasks to be performed on successive floors may be worked out and displayed. For example, bars 80, 82, 86, 88, may represent part of the mechanical and electrical task to be performed by a given work crew on successive floors. After completing the task on floor 3, the crew proceeds to perform the same task on floor 4, and so on. Another work crew may begin on a different aspect of the mechanical and electrical task on floor 3 (bar 90), then proceed to floor 4 and so on. Although that crew will begin its work on floor 3 substantially later than the first crew, it will work faster per floor and, by floor 7 would find itself interfering with the first crew. To avoid the inefficiencies of those two crews working together on the same floor, the second crew would go next to floor 9 (as indicated by connecting line 92), then to floor 7 (line 94), then to floor 8, and so on.

Note that the tasks depicted in FIG. 5 form a matrix of quantified bars arrayed over time (along the horizontal axis) and location (along the vertical axis). Reaching a schedule through the alterations of relative starting times and sequence for the tasks and their dependencies based on all of the template information organized by location is described as a "matrix-balanced scheduling method." Note also that in FIG. 5, the improving productivity of a work crew as it proceeds from floor to floor and becomes more efficient in its work may be represented by a changing slope of a line passing through the centers of the bars on successive floors.

We turn now to a more detailed explanation of how the quantified bar chart of FIG. 4 would be generated.

Referring to FIGS. 6 and 27, the planner first stores (160) in the cells of a spreadsheet the data for the template. Each line in the spreadsheet represents a crew specialty (column AE) and each column represents some aspect of the work of that crew. The planner would enter the quantity of work (columns AF and AG), the contracted unit cost (columns AH and AI), the total contracted cost (column AJ), and the wage rate (column AK). The computer would then augment the spreadsheet data (162) by calculating the manpower required (column AL) based on the contracted cost and the wage rate, and the productivity (column AM) based on the quantity of work and the calculated manpower. The computer could also report the experienced productivity rate (column AN) based on other projects. The planner would then, based on experience, adopt a productivity value (column AO). The computer would then calculate the adopted manpower value (column AP) based on the quantity of work and adopted productivity. The planner might then specify that the job is to be done in about 10 days, and the computer would calculate the actual working days required and the size of the crew (columns AQ and AR).

The computer would also automatically generate the totals shown in row 15.

As indicated by the line 164, the computer thus aids the planner to complete the spreadsheet (168) by an iterative process.

Figure 7:
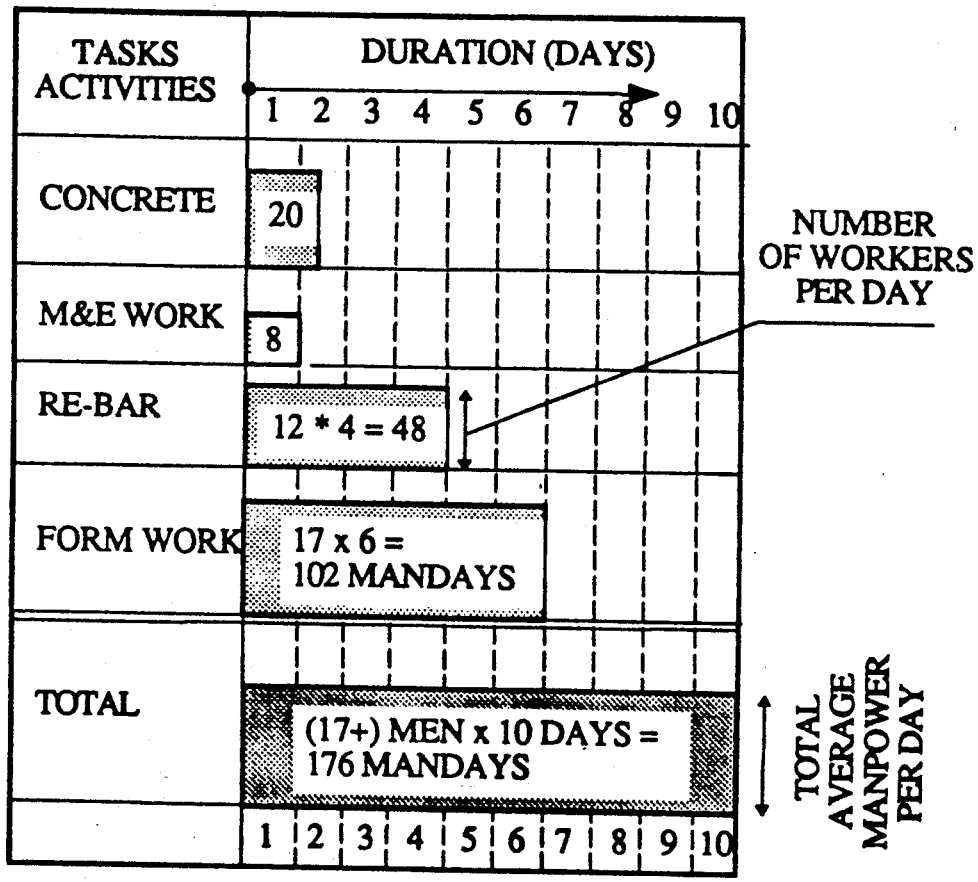
FIG. 7 is a diagram like FIG. 4 at an earlier stage of development.

Referring also to FIG. 7, as the data is being entered on the spreadsheet by the planner, the corresponding quantified bars are being automatically generated (162), reflecting the data in columns AQ and AR of FIG. 6. The planner specifies the vertical and horizontal scales for the bars and indicates whether the vertical scale is to represent quantity, manpower, or cost (160).

Note that the dependencies among the bars in FIG. 7 have not yet been shown because they have not yet been indicated by the planner. The planner's next step is to indicate those dependencies, either by moving the bars using a mouse, or specifying numerically the starting and ending times for each block. The result is the quantified bar chart of FIG. 4.

The planner could alternatively have created the quantified bars directly (170) using the mouse, and the computer would have generated (172) the corresponding data in columns AQ and AR and other columns that are affected.

The computer also automatically performs the folding up operation to create bar 26 of FIG. 4, and the corresponding aggregate values in row 15 at columns AP, AQ, AR. Furthermore, the folded up bar and aggregate values may be used in a higher level template and any changes in them will automatically be reflected in that higher level template.

Figure 8:
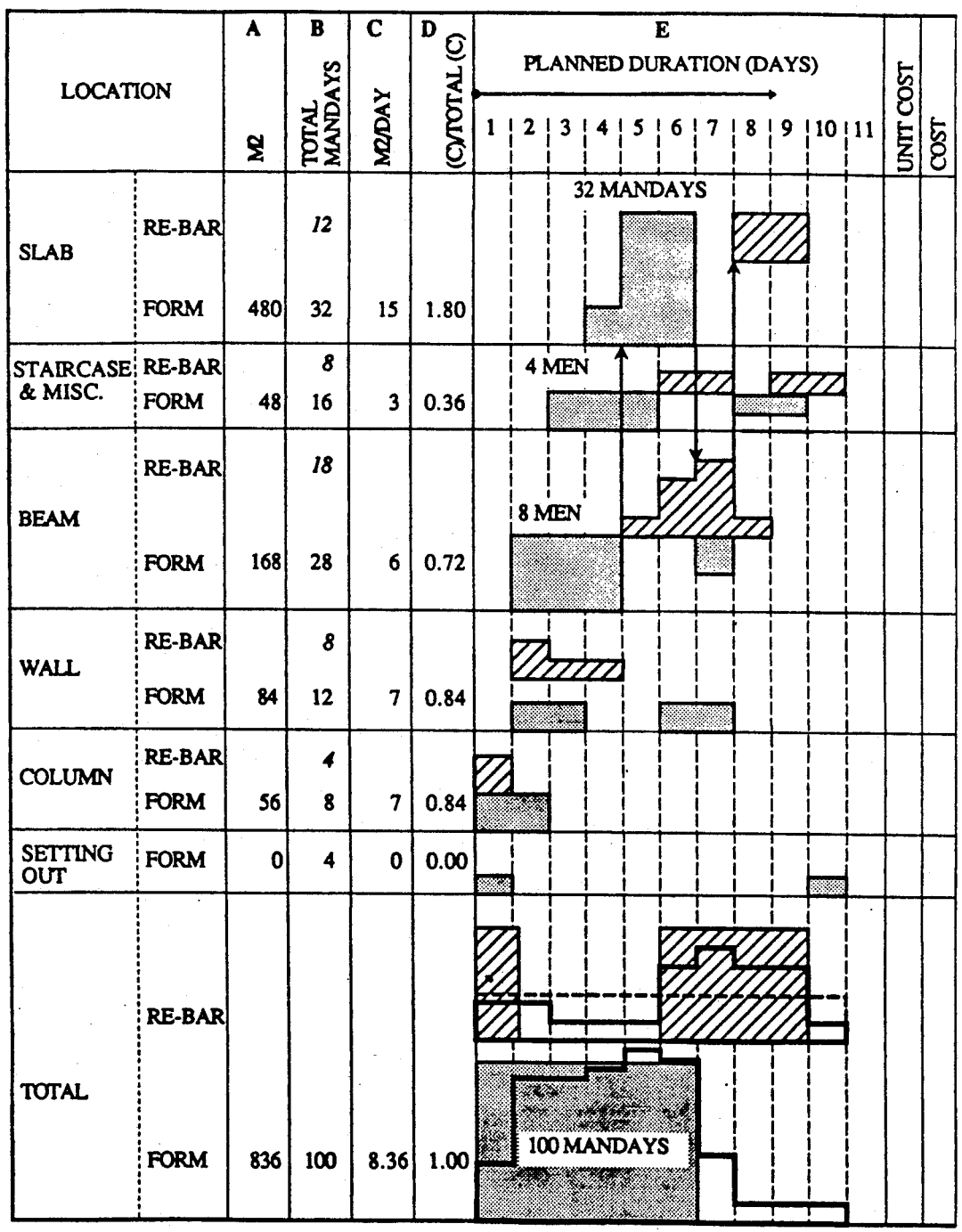
FIG. 8 is a detailed template at a level below the template of FIG. 4.

By developing lower level templates in detail, it is possible to impart more precision to the higher level template. Referring also to FIG. 8, for example, the form and re-bar tasks of the template of FIG. 4 are broken down into more detailed level tasks with the critical path relationships represented by the positions of the bars.

Having developed the quantified bar chart for one floor of the building, the planner may then easily expand his analysis (174) to the other floors. Referring also to FIG. 9, for example, the concrete work, form work, re bar work, and M & E work can be arrayed across a spreadsheet with each line representing one floor of a building. The information from FIG. 6 may be entered on, say floor 7, line 12 of the new spreadsheet. Assuming that floor 7 is fairly typical, the same data can be spread to the other floors on the basis of a ratio of floor area (columns B and C). Thus by entering the floor areas or even the ratio values, the planner can cause the other floors to inherit the values from floor 7 or appropriate fractions of those values. Similar ratios are provided in columns H, M, R, and V. Once the full spread sheet has been developed by the computer based on the inheritance principle, the planner may use his judgment to alter specific values on specific floors (176). Roof work, for example, is different from the work on the other floors and the two cannot be related by a simple ratio based on floor area. The quantified bars for form work are shown in black and for re-bar work are shown shaded. The folded up bars at the bottom of FIG. 8 correspond to the re-bar and form work bars of FIG. 4.

Figure 10:
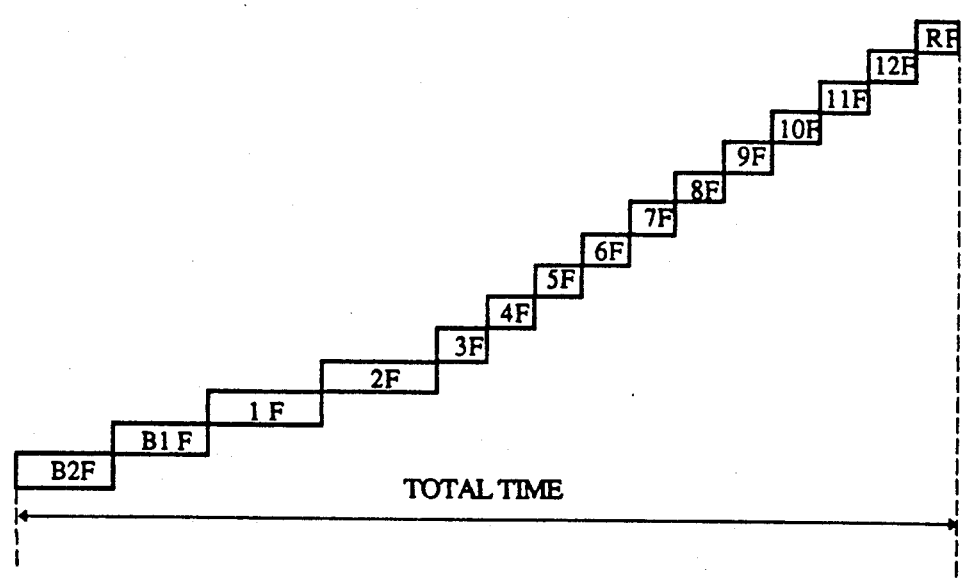
FIGS. 10, 11 are diagrams illustrating contraction and expansion of tasks.

As with any quantified schedule, FIG. 9 is automatically converted by the computer to a quantified bar chart (178). Referring to FIG. 10, each bar in the chart represents the work required for one of the floors (column AB of FIG. 9) and the bars are arranged to reflect the assumption that a single crew will begin at the basement and finish each floor in succession. The planner may then determine whether the total time contemplated is too great, or shorter than need be.

Figure 11:
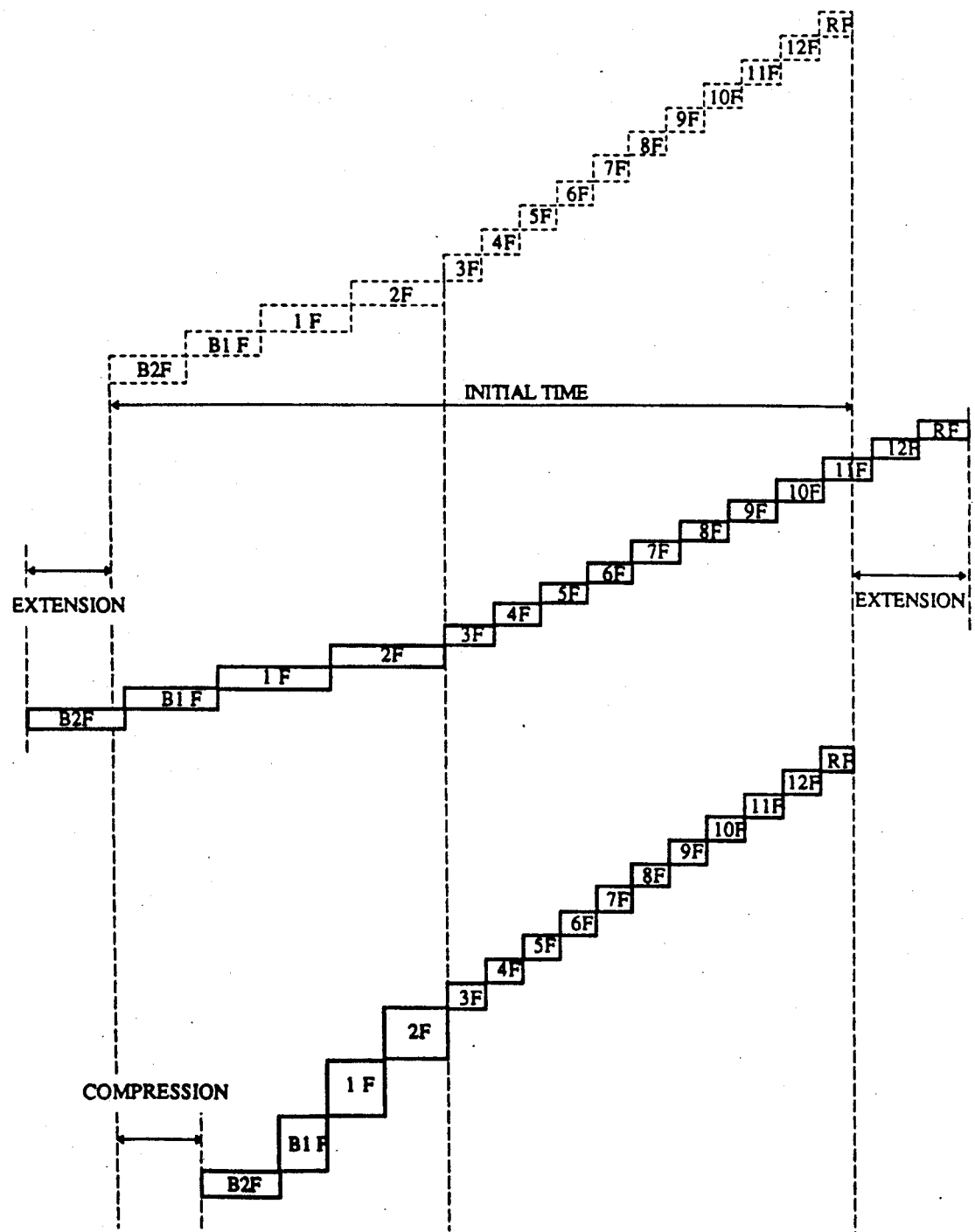

If too short, the planner can extend (180) the time by reducing the number of men on the crew, either floor by floor or for all floors (the upper half of FIG. 11 shows an extension based on increasing the crew size for all floors). If the total time is too great, it may be reduced by increasing the crew size, as seen in the bottom half of FIG. 11. The change can be made either by using a mouse to manipulate the quantified bars themselves or by changing the data on the quantified schedule. Note that an increase in crew size produces wider, but shorter bars and a decrease in crew size produces narrower, but longer bars, as expected.

In general, quantified bars may be modified in a variety of ways, including a shift along the time axis within the float constraints (182) applicable to the bar, expansion or contraction along the time axis or the total work axis (as in FIG. 11), aggregation of two related serial activities into a single quantified bar, and aggregation of two parallel activities into a single bar spanning the same time period.

Referring to FIG. 29, thus the system may be used iteratively to develop a plan for the performance of the various tasks of a project. First the planner estimates the quantities of resources for the tasks (210), establishes the method of completing the project based on selected tasks (212), decides the sequence of specific tasks (214), and decides the duration of specific tasks (216). Then with the aid of software (218), including speed conversion factors (220, 222), the corresponding quantified bar charts can be displayed (224) to the planner. If the plan represented by the charts is acceptable (226) it is implement (228); otherwise adjustments are made iteratively (230).

Referring to FIG. 28, we now turn to a description of how the matrix balanced quantified bar chart of FIG. 5 for the finish work on a building might have been generated by a planner.

Figure 12:
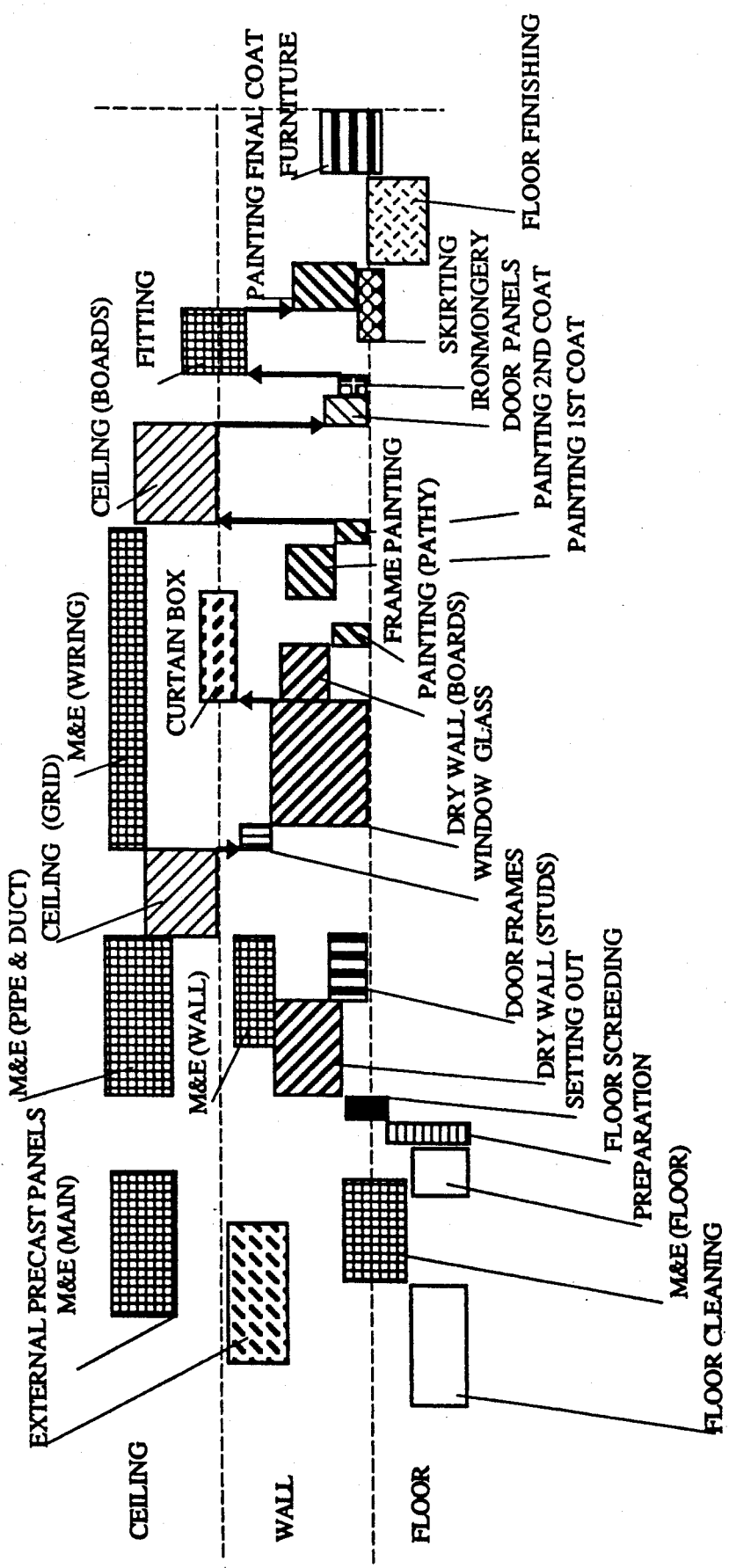
FIGS. 12 through 18 are successive stages in the development of the matrix balanced chart of FIG. 5.
Figure 13:
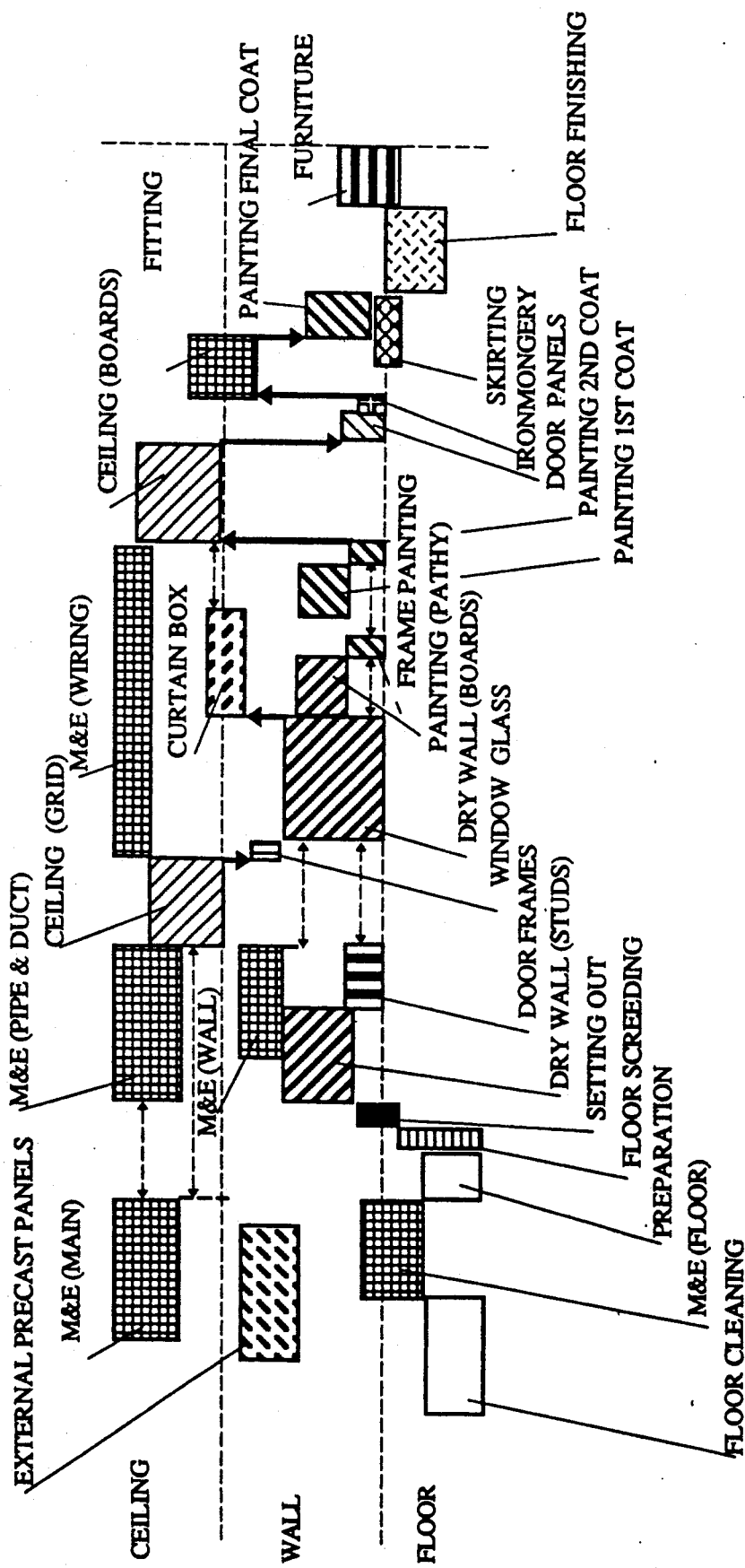

Referring also to FIG. 12, first the planner develops a detailed template (190) for the ceiling, floor, and wall tasks (separated vertically in the figure) for a representative room on a typical floor organized by crew specialty (depicted by bars of different shading). Critical path considerations are then added (192), as in FIG. 13.

Figure 14:
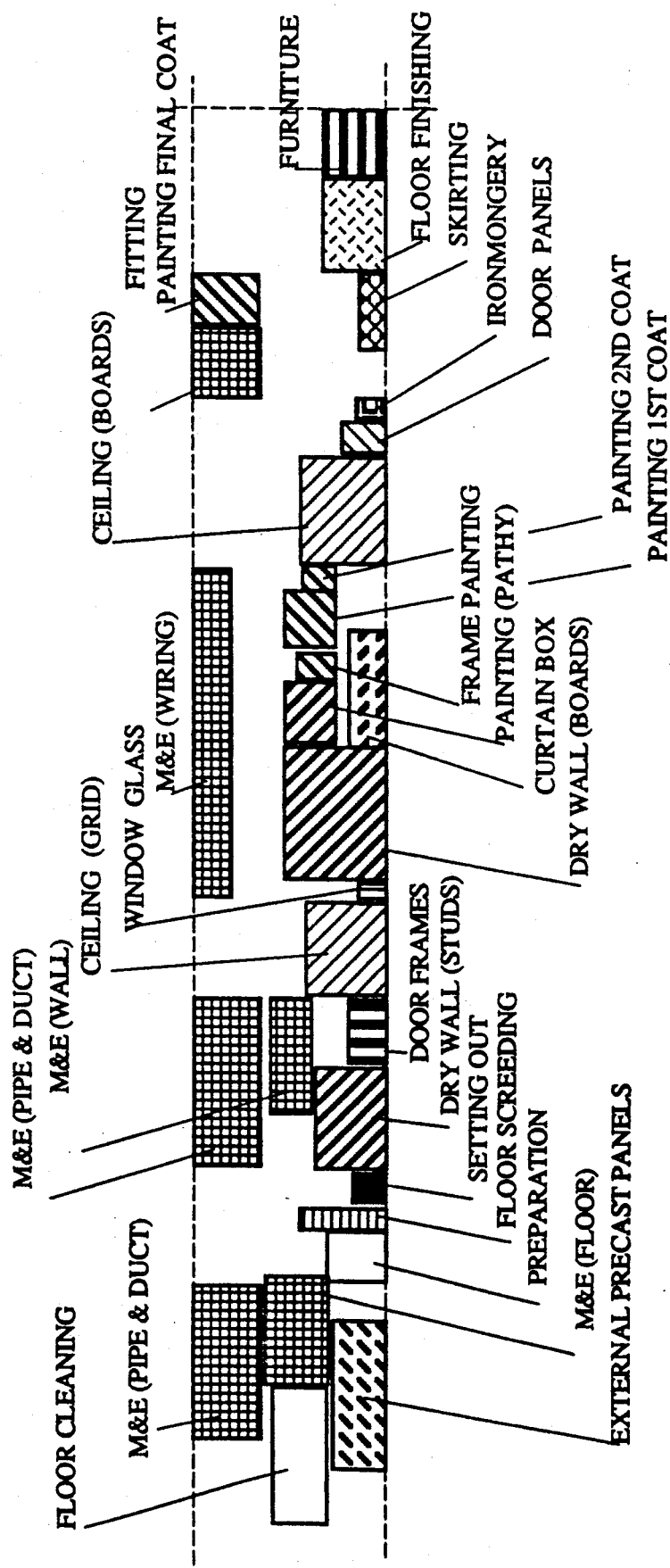

Referring also to FIG. 14, next the bars are compressed vertically (194) to eliminate any distinction among tasks and to make it easier to integrate the template to a higher level.

Figure 15:
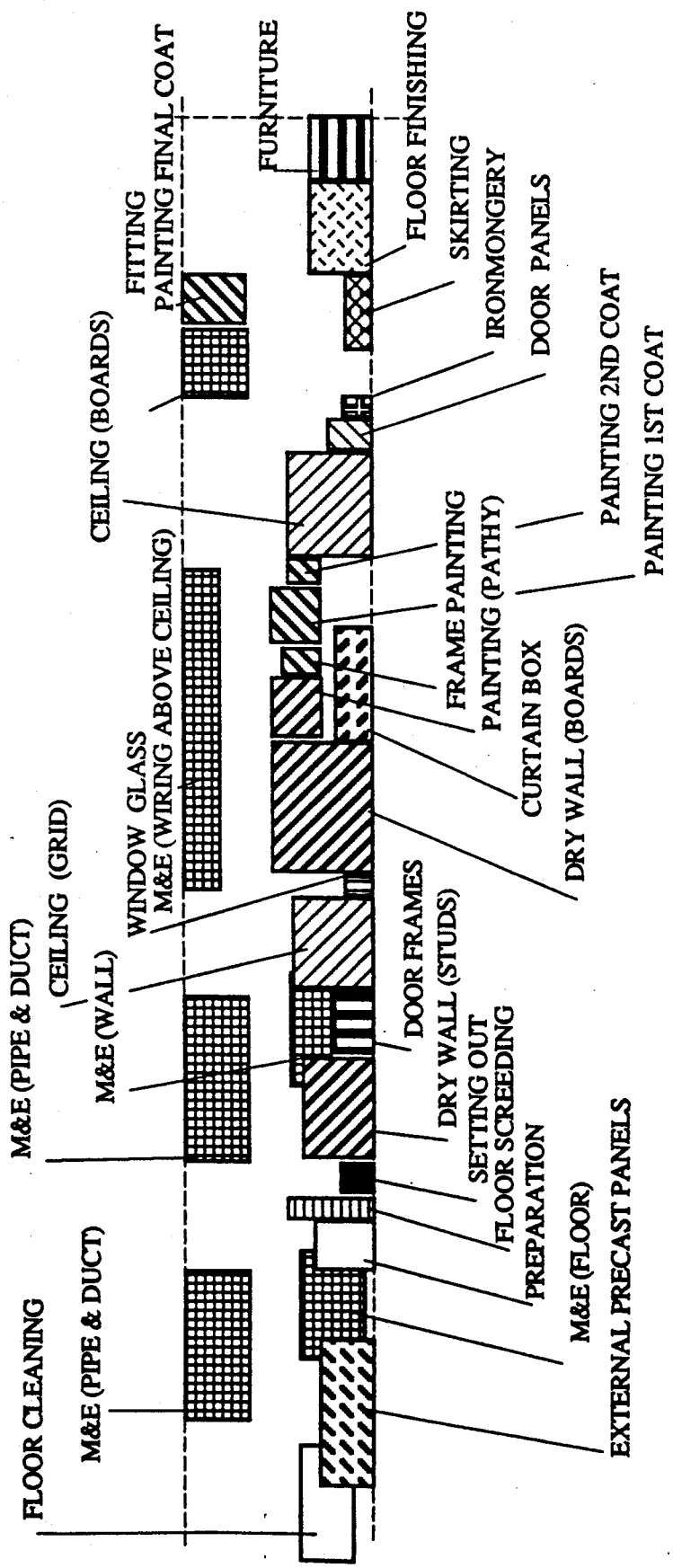
Figure 16:
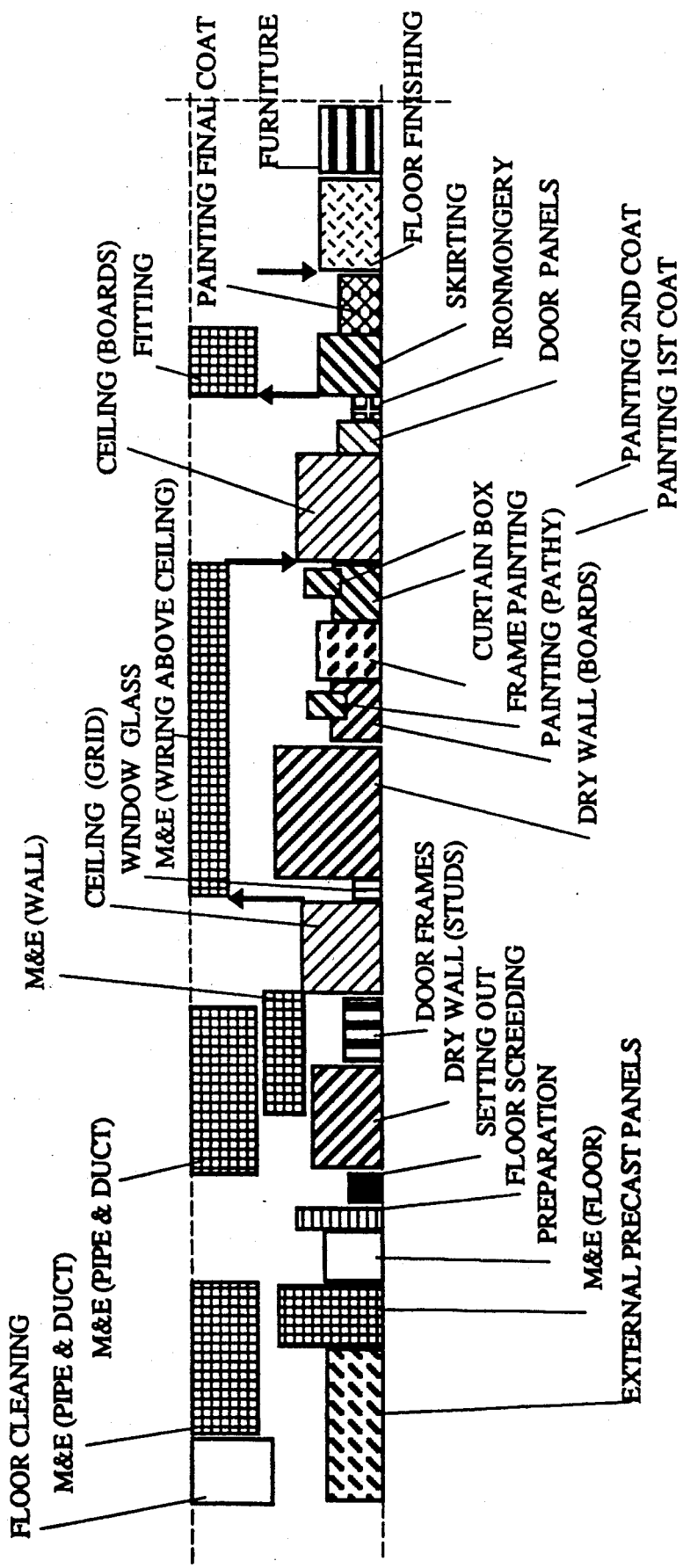
Figure 17:
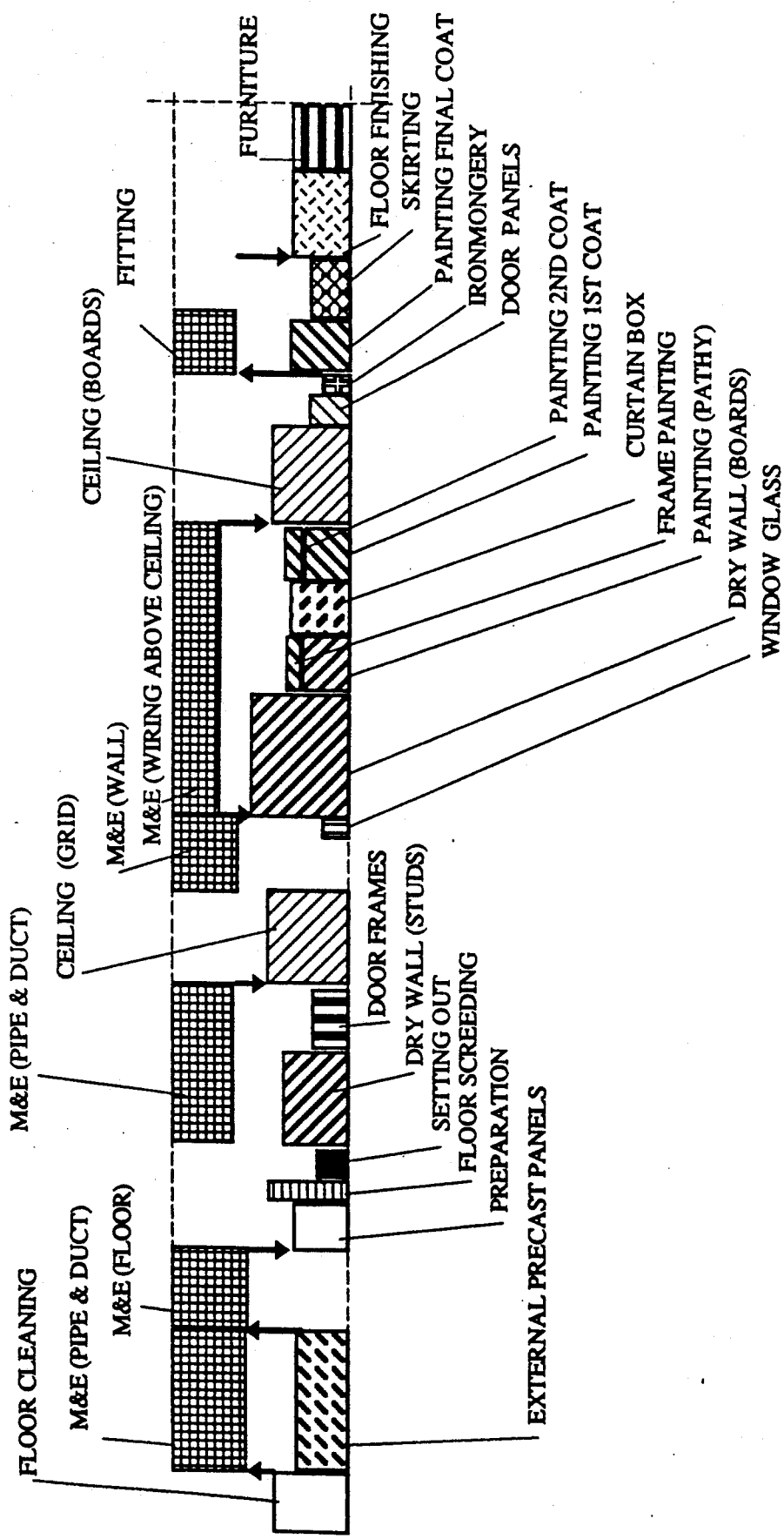

Referring also to FIG. 15, the template is converted to one for the whole floor (196) by taking account of variations in rooms across the floor, and the floor template is further adjusted to move the bars (198) into two streams (upper and lower) designed to reflect the use of two crews working in parallel. The tasks performed in the two streams are reallocated (201) to reduce the total time while still satisfying the critical path requirements (FIG. 16). After further simplification (FIG. 17), the template is ready for inclusion as one floor in a matrix balanced chart of the whole building.

Figure 18:
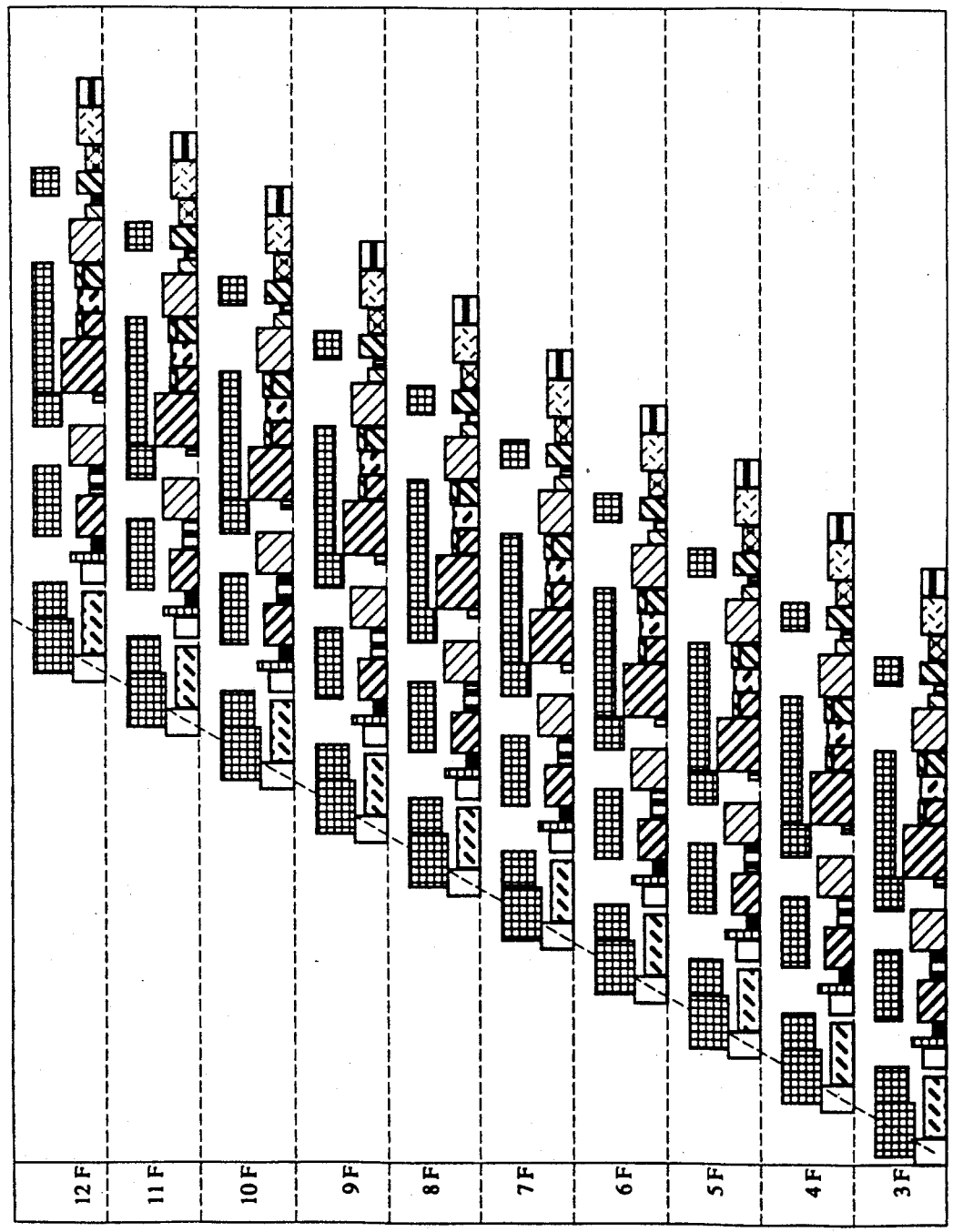

Referring to FIG. 18, the finish work for floors 3 through 12 has been laid out (203) without consideration for labor leveling. That is, it may be inefficient to perform the work in the manner suggested by FIG. 18, because doing so may require more men in the middle of the job than at the beginning and end.

Figure 19:
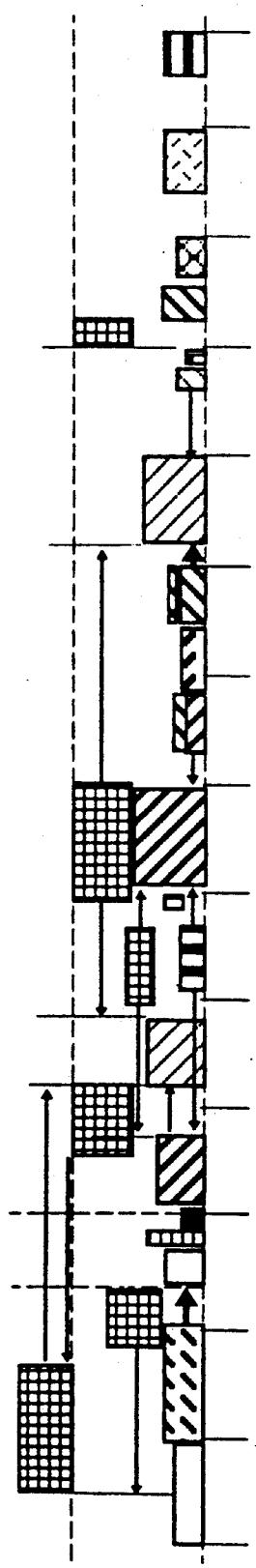
FIG. 19 is a diagram illustrating critical path considerations corresponding to the diagrams of FIGS. 12 through 18.

Referring to FIG. 19, by reconsidering the float associated with the critical path of the finishing process, it is possible for the planner to improve the labor balance (205) for the job as a whole. In FIG. 19, the floats are indicated by horizontal arrows.

Referring to FIG. 20, if one were to array the bars for the various activities by joining them corner to corner (to represent for example that when the floor cleaning crew is done cleaning floor 3, it proceeds to clean floor 4), then the bar chart will not easily depict the work on a floor by floor basis because of the varying widths of different tasks.

Referring to FIG. 21, on the other hand, if the tasks were all forced to have the same width (which would then depict the floors in a visually sensible manner) the information about the resources required for each task is lost.

Referring again to FIG. 5, by using the matrix balanced chart of the invention, both the resources required by each task and the floor by floor arrangement of tasks are visible on the chart.

Referring also to FIG. 22, the matrix balanced bar chart can be reduced to a quantified bar chart in which the bars are organized by activity rather than by floor. In FIG. 22, the process of conversion has not been completed. Dashed line blocks are blocks of FIG. 5 that have been reorganized by activity.

This facilitates the planner's work in adjusting the tasks to achieve labor balance as reflected on the finished chart of FIG. 5.

The quantified bar chart may also be converted to a conventional bar chart, by making all the bars of equal width (i.e., eliminating any variation based on resources required).

Referring to FIG. 26 the overall plan for a construction project could include a master matrix balanced chart 150, supported by matrix balanced charts for temporary work, structure work, finishing work, and external work 152, 154, 156, 158, with corresponding templates and microtemplates at lower levels.

The project planner or project superviser may also use the created templates for monitoring the progress of the project. Referring to FIG. 23, for example, the actual experience with respect to the template of FIG. 4 has been superimposed on the original template. The user enters actual data on a daily basis on the lowest level templates.

Referring to FIG. 24, another kind of monitoring can be easily done from a monitoring chart generated by the computer directly from the matrix balanced schedule. Shaded blocks indicate tasks that have been completed on various floors.

The system would be implemented on an appropriately programmed workstation using software that would permit interactive development of templates and monitoring of project progress.

The system would be menu-driven, and would ideally use icons and other graphical tools to enhance the interface. Cursor control could be through a mouse.

Inheritance techniques would be used to reduce the effort in generating duplicative templates, such as for multiple floors and multiple rooms, as previously explained.

The software would permit the user complete freedom to view any template at any level, to adjust any template at any level, and to monitor the project at any level.

The software would, at all levels, provide as much assistance as possible to the user in terms of computing values and displaying bars. For example, as previously mentioned, when the user manipulates a quantified bar with a mouse, for instance, the system automatically converts this information into a new entry in the appropriate section of the spreadsheet in the template after the user indicates that the manipulation of the quantified bar is completed. If the user changes the horizontal dimension of a quantified bar to denote a change in the duration of a task, the system adjusts the dedicated resources by changing the vertical dimension of the quantified bar, denoting a change in the dedicated resources. When changes are made to either the vertical dimension or the horizontal dimension of a quantified bar by the user, and the total work involved in the task is not altered, the system automatically maintains the same area for the quantified bar and makes the appropriate adjustments. If the user directly alters the alphanumerical data in the spreadsheet in the template, the system automatically changes the visual configuration of the quantified bars in a corresponding fashion. In addition, after changes are introduced to one or more quantified bars in a template, the system automatically adjusts the folded up bar in the template.

A user may alter data in any level of the hierarchy. When changes are introduced at one level of the hierarchy, the corresponding folded up bar is automatically altered and this information is automatically transferred to all higher levels in the hierarchical system. However, the system cannot automatically transfer changes to lower levels of the hierarchy unless the user defines specific relationships to be followed. For instance, a change in the duration of a task at an intermediate level can be automatically transferred to higher levels in the hierarchical structure since the higher levels encompass a lower level of detail. However, in the absence of prestored relationships, the system cannot translate a change in the duration of the task into a lower level of the hierarchy in which the altered task is broken down into two or more sub tasks. Therefore, the system contains two types of functions to handle the related modification of lower level templates. The user may define standard relationships. An example of such a relationship would be setting a function so that any modification of the duration of a task would be equally spread among all subtasks into which the task is broken down at lower levels. An alternative relationship might be spreading a change in duration of a task proportionately among the subtasks into which the task is broken down at lower levels, based upon the existing relative durations of the subtasks.

In the absence of preset relationships allowing the system to automatically adjust lower levels, the system would automatically display a warning on the template displays of the unadjusted lower levels indicating that they are out of date. The user may alter the lower levels either directly, based upon specific data for the particular level, and remove the warning indication, or the user may set relationships allowing the system to make change to the lower levels, automatically indicating, as above, that the changes are estimates.

Changes in the starting times of various tasks are among the types of modifications which the user may frequently wish to introduce. One task may not be started until another task is completed. Therefore, if the user attempts to change the starting time of an activity in such a way that it would violate a preset dependent relationship, the system will not accept the change. The user may then either readjust all dependent tasks in such a way as to not violate the preset dependencies or, if possible, the user may reset the dependencies.

For instance, a user change in the data for the resources dedicated to a discrete task at an intermediate level of detail (but without any change to the critical path) results in an alteration of the shape of the quantified bar at that level of detail. A new folded up bar for the tasks in the template to which the change was made is automatically generated. This change in the folded up bar in the template automatically results in a change in the corresponding quantified bar in a template at a higher level, which in turn is automatically carried up through all higher levels of the system. Changes to lower level templates will occur automatically only if predetermined relationships have been defined by the user for example, if the user has predefined how a change in a quantified bar at one level should be distributed among the constituent quantified bars at a more detailed level. If changes cannot automatically be made by the system to alter lower levels to correspond to changes made at higher levels, however, the system will indicate which lower levels are not current. The user can then input additional data to update all lower levels.

Referring to FIG. 25, the system of the invention can be seen as an electronic display device 200 linked to an object generator 202 (for generating the quantified bars) and a dependency generator 204 (for arranging the bars on the display to be indicative of the relationships of the tasks represented by the bars).

Other embodiments are within the following claims. The quantified bars could be shapes other than bars and could be, for example, three-dimensional. The system could be used for any project in which tasks must be planned and managed. The system can form part of a larger system for project management which could include, for example, accounting, purchase order, time keeping, payroll, accounts payable, job estimating, cost control, quality control, and other functions. Expert systems technology can be applied to enhance the use of the quantified bar charts.

We claim:

1. A method to aid graphically the management of a set of tasks, comprising the steps of
   representing a quantity associated with each task by a geometric object of at least two dimensions whose geometric area or volume is indicative of said quantity,
   displaying each said geometric object on a display device, and
   graphically indicating information about dependencies in the performance of said tasks on said display.

2. A method to aid graphically the management of a set of tasks, comprising the steps of
   representing a quantity associated with each task by a geometric object of at least two dimensions whose geometric area or volume is indicative of said quantity,
   displaying each said geometric object on a display device, and
   graphically indicating information about dependencies in the performance of said tasks on said display, including indicating spatial independence between said tasks performed at spatially distinct locations.

3. A method to aid graphically the management of a set of tasks, comprising the steps of
   representing a quantity associated with each task by a geometric object of at least two dimensions whose geometric area or volume is indicative of said quantity,
   displaying each said geometric object on a display device,
   graphically indicating information about dependencies in the performance of said tasks on said display,
   associating a set of said objects representing related tasks at a first level of said project together on said display device, and
   generating an object at a higher level to represent a combination of said set of objects at said first level such that the configuration of said higher level object as displayed is indicative of the total resources required to perform the tasks represented by the objects at the first level.

4. The method of claim 3 wherein said generating step includes,
   automatically changing the configuration of said higher level object in response to changes made to an object in said set at said first level.

5. The method of claim 3 wherein said indicating step includes
   indicating the times at which said first level tasks are to begin and end by the position of said higher level object on said display.

6. A method to aid graphically the management of a set of tasks, comprising the steps of
   representing a quantity associated with each task by a geometric object of at least two dimensions whose geometric area or volume is indicative of said quantity,
   displaying each said geometric object on a display device,
   graphically indicating information about dependencies in the performance of said tasks on said display, and
   arranging objects on said display to graphically indicate the spatial independence of sets of tasks.

7. The method of claim 6 wherein
   said sets of tasks are repetitive tasks to be performed at different locations, and
   said arranging step includes
   representing said sets of tasks by objects arranged along parallel rows on said display.

8. The method of claim 7 wherein said arranging step includes
   organizing said repetitive tasks in groups to be performed by respective work crews, where a given work crew works on all tasks within a group regardless of location, and
   arranging said objects on said display to indicate the sequence of tasks to be performed by each said work crew.

9. The method of claim 8 wherein said arranging step includes
   positioning the tasks in each said row to reflect the dependencies of said tasks.

10. A method to aid graphically the management of a set of tasks, comprising the steps of
    representing a quantity associated with each task by a geometric object of at least two dimensions whose geometric area or volume is indicative of said quantity,
    displaying each said geometric object on a display device,
    graphically indicating information about dependencies in the performance of said tasks on said display, and
    providing a user interface to permit the user to alter the size, shape, and location of each said object on said display.

11. The method of claim 1, 2, 3, 6 or 10 wherein said representing step includes indicating the period of time required for said task by the extent of said object along one said dimension.

12. The method of claim 1, 2, 3, 6 or 10 wherein said representing step includes indicating an amount of resources per unit time required for said task by the extent of said object along one said dimension.

13. The method of claim 1, 2, 3, 6 or 10 in which said quantity associated with each said task comprises the aggregate amount of resources required for said task.

14. The method of claim 13 in which said resources comprise money, or manpower, or quantity of work.

15. The method of claim 1, 2, 3, 6 or 10 wherein said indicating step includes
    indicating information about dependencies in the performance of said tasks by the position of each said object in the display.

16. The method of claim 1, 2, 3, 6 or 10 wherein said dependencies in the performance of said tasks include temporal dependencies.

17. The method of claim 1, 2, 3, 6 or 10 wherein said indicating step includes
    indicating dependencies in the performance of said tasks by lines connecting the objects.

18. The method of claim 1, 2, 3, 6 or 10 in which said object occupies a position on said display that is indicative of the times when said task is to begin and end.

19. The method of claim 18 in which the display defines a time axis and said objects are arranged along said time axis to indicate the relative times when said tasks are to begin and end.

20. The method of claim 1, 2, 3, 6 or 10 in which said object is a quantified bar.

21. The method of claim 1, 2, 3, 6 or 10 in which said object is associated with a task in a construction project.

22. The method of claim 1, 2, 3, 6 or 10 wherein said indicating step includes
    graphically indicating on the display device information about the required sequence in which tasks are to be performed.

23. The method of claim 22 wherein said indicating step includes
    graphically indicating the required sequence by joining the boundaries of successive objects in the sequence.

24. The method of claim 22 wherein said indicating step includes
    graphically indicating the required sequence by lines connecting said objects.

25. The method of claim 1, 2, 3, 6 or 10 further comprising the step of
    displaying alphanumeric data corresponding to said objects in a table associated with said display of said objects.

26. The method of claim 25 in which said alphanumeric data includes information about the times when each said task is to begin and end and the resources per unit time required for said task.

27. The method of claim 26 further comprising the step of
    computationally linking said table and said objects so that changes made to either said objects or said table are automatically translated to changes in the other.

28. The method of claim 25 wherein said displaying step includes
    simultaneously displaying said table and said objects.

29. The method of claim 25 in which said table is in the form of a spread sheet in which cells are related by computational rules.

30. A method to aid graphically the management of a construction project which includes a set of tasks, comprising the steps of
    representing each task by a quantified bar whose area is indicative of a quantity of resources required for said task,
    displaying each said quantified bar on a display device, and
    graphically indicating information about dependencies in the performance of said tasks on said display either by the positions of said objects or lines interconnecting the objects.

31. A method to aid graphically the management of a set of tasks, comprising the steps of
    representing a quantity associated with each task by a geometric object of two dimensions and more than four sides and whose geometric area or volume is indicative of said quantity,
    displaying each said geometric object on a display device, and
    graphically indicating information about dependencies in the performance of said tasks on said display.

32. Apparatus to aid graphically the management of a set of tasks, comprising
    object generator means for generating for each task a geometric object of at least two dimensions whose geometric area or volume is indicative of a quantity associated with said task,
    a display device for displaying each said geometric object, and
    dependency generator means for indicating graphically on said display information about dependencies in the performance of said tasks.

33. Apparatus to aid graphically the management of a set of tasks, comprising
    object generator means for generating for each task a geometric object of at least two dimensions whose geometric area or volume is indicative of a quantity associated with said task,
    a display device for displaying each said geometric object, and
    dependency generator means for indicating graphically on said display information about dependencies in the performance of said tasks including indicating spatial independence between said tasks performed at spatially distinct locations.

34. Apparatus to aid graphically the management of a set of tasks, comprising
    object generator means for generating for each task a geometric object of at least two dimensions whose geometric area or volume is indicative of a quantity associated with said task,
    a display device for displaying each said geometric object,
    dependency generator means for indicating graphically on said display information about dependencies in the performance of said tasks,
    association means for associating a set of said objects representing related tasks at a first level of said project together on said display device, and
    hierarchy means for generating an object at a higher level to represent a combination of said set of objects at said first level such that the configuration of said higher level object as displayed is indicative of the total resources required to perform the tasks represented by the objects at the first level.

35. Apparatus to aid graphically the management of a set of tasks, comprising
    object generator means for generating for each task a geometric object of at least two dimensions whose geometric area or volume is indicative of a quantity associated with said task, a display device for displaying each said geometric object, and dependency generator means for indicating graphically on said display information about dependencies in the performance of said tasks, and for arranging objects on said display to graphically indicate the spatial independence of sets of tasks.

36. Apparatus to aid graphically the management of a set of tasks, comprising object generator means for generating for each task a geometric object of at least two dimensions whose geometric area or volume is indicative of a quantity associated with said task, a display device for displaying each said geometric object, dependency generator means for indicating graphically on said display information about dependencies in the performance of said tasks, and a user interface to permit the user to alter the size, shape, and location of each said object on said display.

* * * * *